United States Patent
Kozen et al.

(10) Patent No.: US 10,826,065 B2
(45) Date of Patent: Nov. 3, 2020

(54) PROTECTION LAYERS FOR METAL ANODES

(71) Applicant: University of Maryland, College Park, College Park, MD (US)

(72) Inventors: Alexander C. Kozen, College Park, MD (US); Marshall A. Schroeder, Sykesville, MD (US); Gary W. Rubloff, Clarksville, MD (US); Liangbing Hu, Hyattsville, MD (US); Malakhi Noked, Rockville, MD (US); Sang Bok Lee, Clarksville, MD (US)

(73) Assignee: University of Maryland, College Park, College Park, MD (US)

( * ) Notice: Subject to any disclaimer, the term of this patent is extended or adjusted under 35 U.S.C. 154(b) by 476 days.

(21) Appl. No.: 15/517,126

(22) PCT Filed: Oct. 5, 2015

(86) PCT No.: PCT/US2015/054083
§ 371 (c)(1),
(2) Date: Apr. 5, 2017

(87) PCT Pub. No.: WO2016/057426
PCT Pub. Date: Apr. 14, 2016

(65) Prior Publication Data
US 2017/0263935 A1    Sep. 14, 2017

Related U.S. Application Data

(60) Provisional application No. 62/060,345, filed on Oct. 6, 2014.

(51) Int. Cl.
*H01M 4/62* (2006.01)
*H01M 4/36* (2006.01)
(Continued)

(52) U.S. Cl.
CPC ............ *H01M 4/62* (2013.01); *H01M 4/134* (2013.01); *H01M 4/1395* (2013.01);
(Continued)

(58) Field of Classification Search
CPC ........... H01M 10/0525; H01M 4/1395; H01M 4/366; H01M 4/134
See application file for complete search history.

(56) References Cited

U.S. PATENT DOCUMENTS

| | | | |
|---|---|---|---|
| 5,314,765 A | 5/1994 | Bates | |
| 6,214,061 B1 | 4/2001 | Visco et al. | |

(Continued)

FOREIGN PATENT DOCUMENTS

| | | |
|---|---|---|
| EP | 1057222 A1 | 12/2000 |
| EP | 1093672 A1 | 4/2001 |

(Continued)

OTHER PUBLICATIONS

Guan et al., "Ultrathin surface coatings to enhance cycling stability of $LiMn_2O_4$ cathode in lithium-ion batteries," *Ionics*, 2013, 19: pp. 1-8.

(Continued)

*Primary Examiner* — Stewart A Fraser
(74) *Attorney, Agent, or Firm* — Klarquist Sparkman, LLP

(57) ABSTRACT

A protection layer is formed on a highly-reactive substantially-pure metal anode to a thickness of between 1 nm and 200 nm, inclusive, using atomic layer deposition (ALD). The ALD protection layer allows the conduction of ions of the metal of the anode therethrough but suppresses electron transport therethrough. The ALD protection layer may also be effective to inhibit passage of air and/or water therethrough. The ALD protection layer can allow more relaxed purity requirements for subsequent battery assembly, elec- (Continued)

trolyte specifications, and/or cathode gas purity. Fabrication methods for the protection layers, protected metal anodes, and systems and devices incorporating such protected metal anodes are also disclosed herein.

14 Claims, 11 Drawing Sheets

(51) Int. Cl.
*H01M 10/0525* (2010.01)
*H01M 4/1395* (2010.01)
*H01M 10/05* (2010.01)
*H01M 4/134* (2010.01)
H01M 4/02 (2006.01)

(52) U.S. Cl.
CPC ........... *H01M 4/366* (2013.01); *H01M 10/05* (2013.01); *H01M 10/0525* (2013.01); *H01M 2004/027* (2013.01)

(56) References Cited

U.S. PATENT DOCUMENTS

| | | | |
|---|---|---|---|
| 6,225,002 B1 | 5/2001 | Nimon et al. | |
| 6,402,795 B1 | 6/2002 | Chu et al. | |
| 6,685,804 B1 | 2/2004 | Ikeda et al. | |
| 7,282,296 B2 | 10/2007 | Visco et al. | |
| 7,285,334 B1 | 10/2007 | Yamashita et al. | |
| 8,734,003 B2 | 5/2014 | Aizenberg et al. | |
| 8,808,901 B2 | 8/2014 | Wang et al. | |
| 2004/0253510 A1 | 12/2004 | Jonghe et al. | |
| 2004/0265698 A1* | 12/2004 | Takada | H01M 4/04 429/233 |
| 2008/0066297 A1 | 3/2008 | Lin et al. | |
| 2008/0102370 A1* | 5/2008 | Kashiwagi | H01M 4/134 429/218.1 |
| 2011/0311882 A1 | 12/2011 | Kim et al. | |
| 2012/0202112 A1* | 8/2012 | Yushin | H01M 4/38 429/200 |
| 2013/0095380 A1* | 4/2013 | Affinito | H01M 4/13 429/207 |
| 2013/0122318 A1 | 5/2013 | Wietelmann | |
| 2015/0050537 A1* | 2/2015 | Christensen | H01M 4/661 429/101 |
| 2015/0064537 A1* | 3/2015 | Christensen | H01M 10/0562 429/126 |
| 2015/0180023 A1 | 6/2015 | Xiao et al. | |

FOREIGN PATENT DOCUMENTS

| | | |
|---|---|---|
| EP | 1552572 A2 | 7/2005 |
| EP | 1629552 | 3/2006 |
| KR | 20130016629 A | 2/2013 |
| WO | WO 1999/043034 | 8/1999 |
| WO | WO 1999/057770 | 11/1999 |
| WO | WO 2004/036669 | 4/2004 |
| WO | WO 2004/109823 | 12/2004 |

OTHER PUBLICATIONS

International Search Report and Written Opinion, dated Feb. 6, 2016, in International Application No. PCT/US15/54083.
Kozen et al., "Atomic layer deposition of the solid electrolyte LiPON," *Chemistry of Materials*, 2015, 27: pp. 5324-5331.
Kozen et al., "Next-generation lithium metal anode engineering via atomic layer deposition," *ACS Nano*, 2015, 9(6): pp. 5884-5892.
Kozen, A., "Atomic layer deposition of solid electrolytes for beyond lithium-ion batteries," PhD Dissertation, University of Maryland, Digital Repository, 2015 [retrieved on Apr. 4, 2017]. Retrieved from the Internet: <URL: http://drum.lib.umd.edu/handle/1903/17032>.
Meng et al., "Emerging applications of atomic layer deposition for lithium-ion battery studies," *Advanced Materials*, 2012, 24: pp. 3589-3615.
Choi et al., "Cycling characteristics of lithium metal batteries assembled with a surface modified lithium electrode," *J. Power Sources*, 2013, 244(c): pp. 363-368.
Chung et al., "Lithium phosphorous oxynitride as a passive layer for anodes in lithium secondary batteries," *Journal of Electroanalytical Chemistry*, 2004, 566(2): pp. 263-267.
Chung et al., "Suppressive effect of lithium phosphorous oxynitride at carbon anode on solvent decomposition in liquid electrolyte," *J. Power Sources*, 2002, 112(2): pp. 626-633.
Heine et al., "Coated lithium power (CLiP) electrodes for lithium-metal batteries," *Adv. Energy Mater.*, 2013, pp. 1-7.
Jung et al., "How do Li atoms pass through the $Al_2O_3$ coating layer during lithiation in Li-ion batteries?," *J. Phys. Chem. Lett.*, 2013, 4(16): pp. 2681-2685.
Kim et al., "Plasma-enhanced atomic layer deposition of ultrathin oxide coatings for stabilized lithium-sulfur batteries," *Adv. Energy Mater.*, 2013, 2(10): pp. 1308-1315.
Kozen et al., Abstract for "Stabilization of Lithium Metal Anodes by Hybrid Artificial Solid Electrolyte Interphase," *Chemistry of Materials*, 2017. DOI: 10.1021/acs.chemmater.7b01496.
Lee et al., "Low-temperature atomic layer deposited $Al_2O_3$ thin film on layer structure cathode for enhanced cycleability in lithium-ion batteries," *Electrochimica Acta*, 2010, 55(12): pp. 4002-4006.
Lotfabad et al., "ALD $TiO_2$ coated silicon nanowires for lithium ion battery anodes with enhanced cycling stability and coulombic efficiency," *Physical Chemistry Chemical Physics*, 2013, 15(32): p. 13646.
Marchioni et al., "Protection of lithium metal surfaces using chlorosilanes," *Langmuir*, 2007, 23(23): pp. 11597-11602.
Riley et al., "Conformal surface coatings to enable high volume expansion Li-ion anode materials," *Chemphyschem*, 2010, 11(10): pp. 2124-2130.
Riley et al., "Electrochemical effects of ALD surface modification on combustion synthesized $LiNi1/3Mn1/3Co1/3O2$ as a layer-cathode material," *J. Power Sources*, 2011, 196(6): pp. 3317-3324.
Riley et al., "Improved mechanical integrity of ALD-coated composite electrodes for Li-ion batteries," *Electrochemical and Solid State Letters*, 2011, 14(3): pp. A29-31.
Xu et al., "Surface-modified silicon nanowire anodes for lithium-ion batteries," *J. Power Sources*, 2011, 196(20): pp. 8583-8589.

* cited by examiner

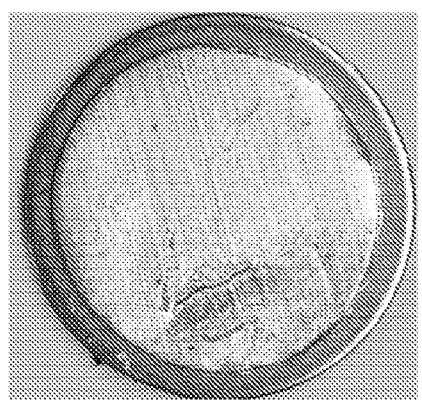
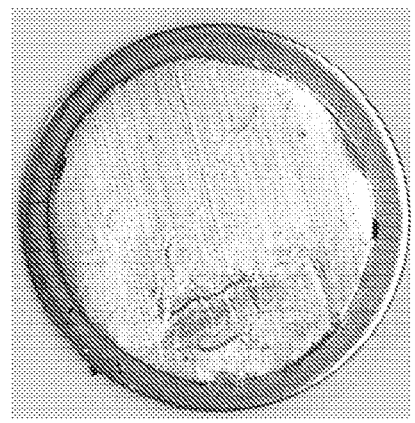
FIG. 5A  FIG. 5B
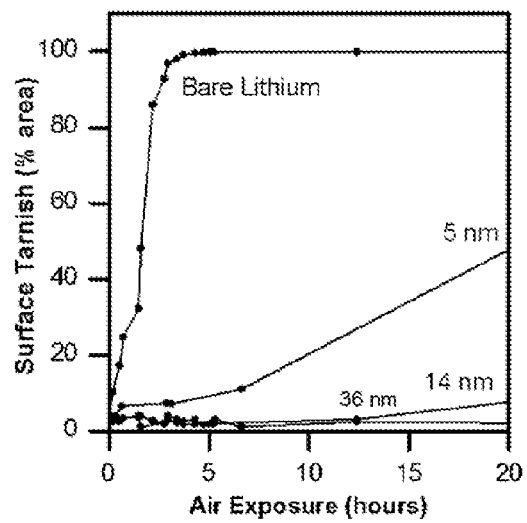
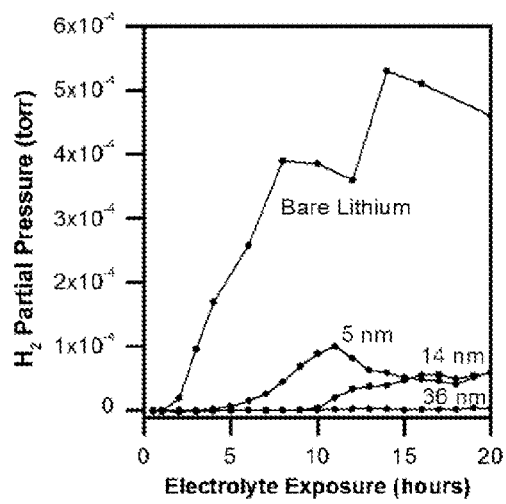
FIG. 6A  FIG. 6B
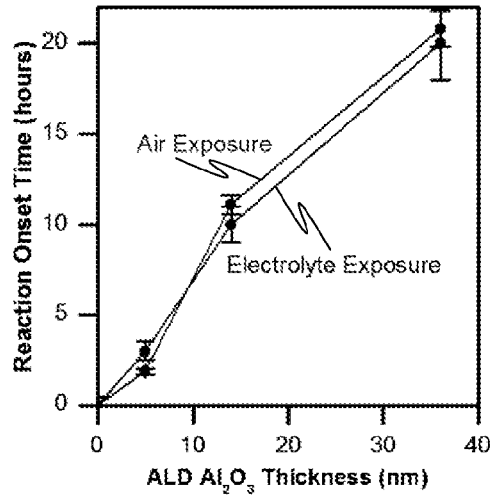
FIG. 6C

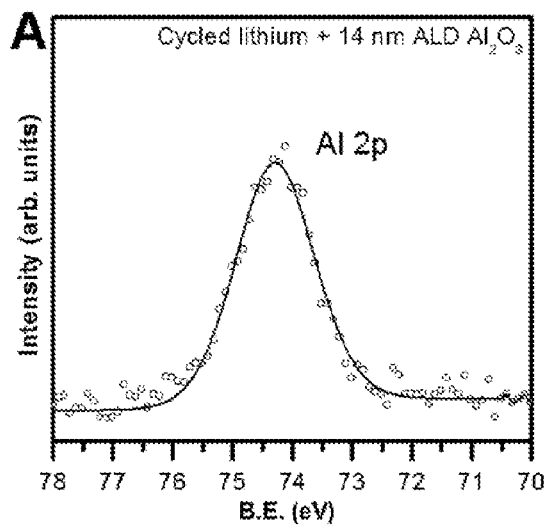
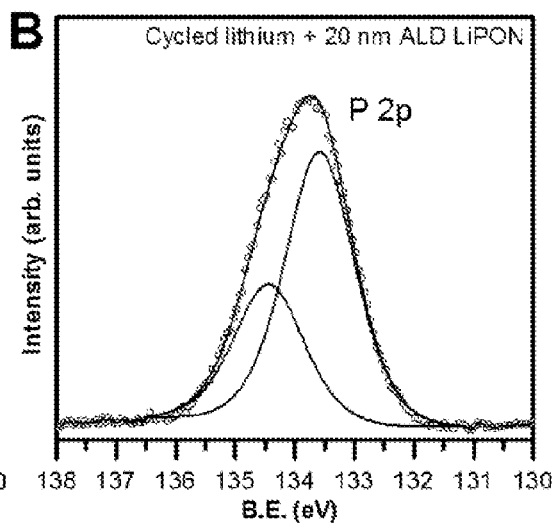
FIG. 16A  FIG. 16B
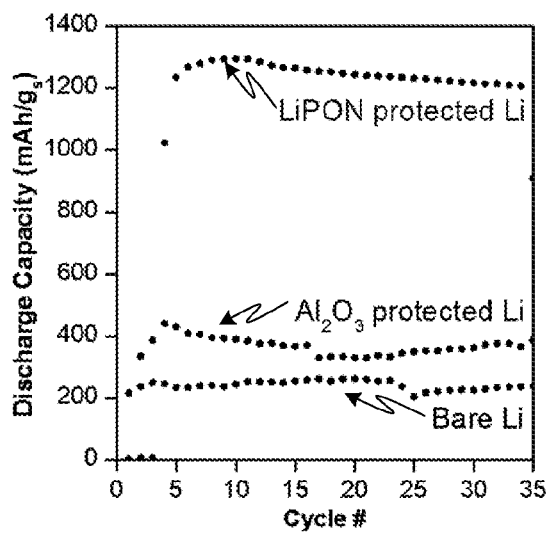
FIG. 17
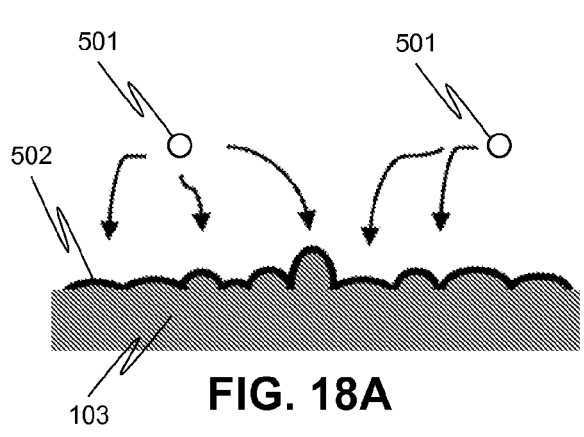
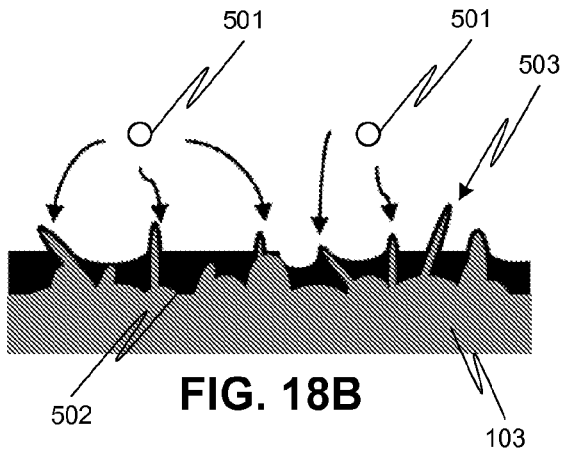
FIG. 18A  FIG. 18B

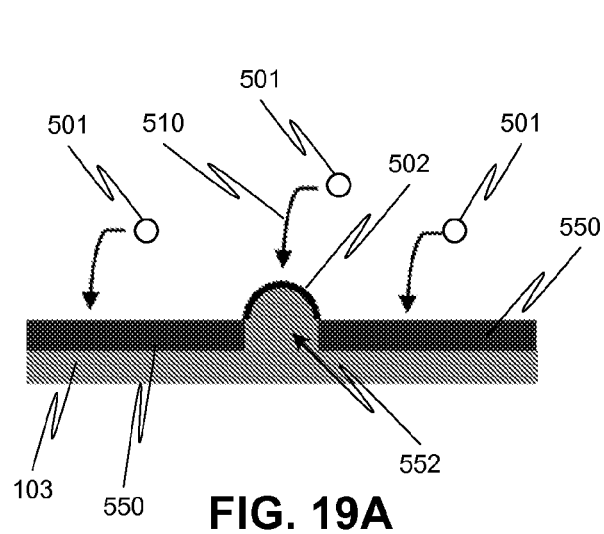
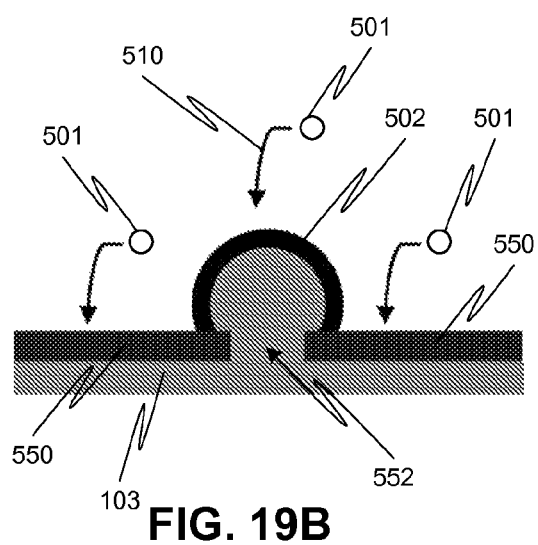
FIG. 19A　　　　　　　　FIG. 19B
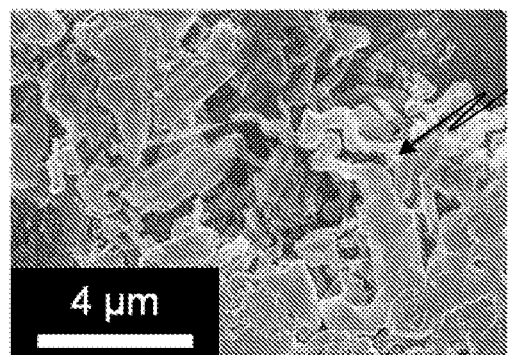
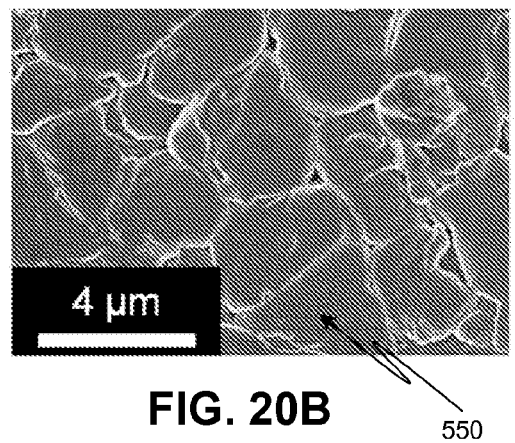
FIG. 20A　　　　　　　　FIG. 20B
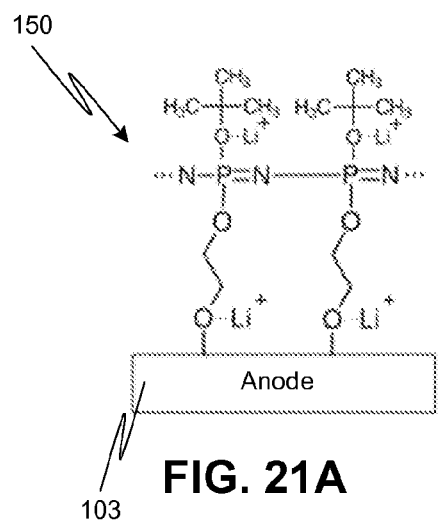
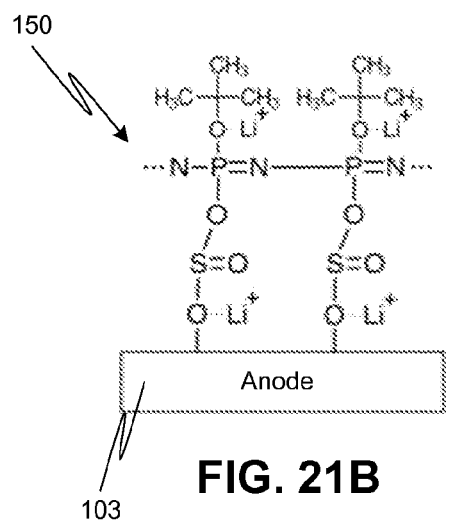
FIG. 21A　　　　　　　　FIG. 21B

PROTECTION LAYERS FOR METAL ANODES

CROSS-REFERENCE TO RELATED APPLICATIONS AND PAPERS

The present application claims the benefit of U.S. Provisional Application No. 62/060,345, filed Oct. 6, 2014, which is hereby incorporated by reference herein in its entirety.

STATEMENT REGARDING FEDERALLY SPONSORED RESEARCH

This invention was made with government support under DESC0001160 awarded by the Department of Energy (DOE). The government has certain rights in the invention.

FIELD

The present disclosure relates generally to protection layers for electrochemical electrodes, and, more particularly, to atomic/molecular layer deposition for protection of highly reactive metal anodes for batteries and energy storage.

BACKGROUND

Demand for higher energy density storage devices for transportation (electric vehicles), grid storage (power leveling), and other applications is increasing. There is increasing demand for a rechargeable battery with a cycle life comparable to that of the lithium (Li) ion but with significantly higher capacity, for use in transportation (e.g., electric vehicles), electricity storage from the power grid (e.g., power leveling), as well as other application. Metal anode systems, such as Li—S and Li—$O_2$, as well as Li in combination with advanced oxide cathode systems, are being investigated as potential options to address these demands.

Indeed, recent analysis by the Joint Center for Energy Storage Research (JCESR) into battery options beyond traditional Li-ion technologies highlights as high a priority the development of metal anode systems, while recognizing that the reactivity of the metal anode poses serious technical and manufacturing challenges. In particular, Li metal has a high reactivity to the organic chemicals typically employed as electrolytes in Li batteries. Corrosion reactions thus occur during cycling of a battery with a Li metal anode due to reduction of solvents, active species, or impurities in the electrolyte. This corrosion leads to the degradation of the anode, consumption of electrolyte and active materials, and eventual battery failure.

In addition, Li metal will oxidize and corrode under atmospheric conditions from exposure to $H_2O$ and $CO_2$ via the following stepwise reactions:

$$2Li + 2H_2O \rightarrow 2LiOH + H_2 \quad (1)$$

$$2LiOH + CO_2 \rightarrow Li_2CO_3 + H_2O \quad (2)$$

producing a characteristic black tarnish on the Li metal surface. This oxidation is prevented by limiting the exposure of the Li metal to $H_2O$, necessitating the use of costly dry rooms for Li metal anode fabrication and subsequent battery assembly.

Prior industry efforts during the late 1980s attempted to exploit the potential of Li metal anodes via electrolyte additive engineering. However, due to the propensity of Li metal to form dendrites upon repeated cycling of the battery thereby causing catastrophic and often dangerous failures, as well as the associated fabrication costs, the use of Li metal anodes fell out of favor.

Protection layers may help to alleviate the reactivity and associated cost issues of working with Li metal anodes. Such protection may be particularly important in batteries where the active material diffuses freely through the electrolyte (e.g., polysulfide in Li—S cells) or if inherent contamination is present in the electrolyte (e.g., $H_2O$, $CO_2$, and $N_2$ in a Li-air system). In such cases, the highly reactive Li metal anode forms a high impedance solid electrolyte interphase (SEI) layer on its surface that consumes electrolyte and active material. This SEI layer formation results in practical capacity loss and low Coulombic efficiency.

Previous attempts to protect Li metal with organic molecules and polymeric coatings have achieved limited success due to poor thickness and composition control of the applied layers. Solid electrolyte films have been deposited on Li metal electrodes via sputtering. While such sputtered films are effective at preventing electrolyte decomposition on the Li metal surface, they can result in large cell overpotentials during recharge due to large thicknesses of the films (i.e., on the order of microns) and low ionic conductivity of the sputtered solid electrolytes. Self-assembled carbon spheres have also been used as a protection layer of a Li metal. While the carbon sphere film may prevent Li dendrite growth during cycling, the film adds significant mass to the anode and its fabrication may present issues for large scale manufacturing.

Embodiments of the disclosed subject matter may address the above-mentioned problems and limitations, among other things.

SUMMARY

Protection layers for metal anodes, and systems and devices incorporating such protected metal anodes are disclosed herein. A highly-reactive substantially-pure metal (or mixture of highly-reactive substantially-pure metals) is used as the anode for a battery. The protection layer is formed on the anode to a thickness of between 1 nm and 200 nm, inclusive, using atomic layer deposition (ALD). The ALD protection layer allows the conduction of anode ions therethrough but suppresses electron transport therethrough. The ALD protection layer may also be effective to inhibit passage of air and/or water therethrough. The ALD protection layer can allow more relaxed purity requirements for subsequent battery assembly, electrolyte specifications, and/or cathode gas purity (e.g., in a Li—$O_2$ or Li-air battery configuration). Fabrication methods for the protection layers, protected metal anodes, and systems and devices incorporating such protected metal anodes are also disclosed herein.

In one or more embodiments, a battery comprises an anode, a cathode, an electrolyte, and a protection layer. The anode consists essentially of a pure metal selected from Group I and Group II materials, or mixtures of pure metals selected from Group I and Group II materials. The electrolyte can be disposed between the anode and the cathode. The protection layer can be formed on the anode by atomic layer deposition and can allow ions of the pure metal or metals to pass therethrough while inhibiting electron passage therethrough.

In one or more embodiments, an electrochemical electrode comprises a structure and a protection layer formed on the structure by atomic layer deposition. The structure can consist essentially of a pure metal selected from Group I and Group II materials, or mixtures of pure metals selected from Group I and Group II materials. The protection layer allows ions of the pure metal or metals to pass therethrough while inhibiting passage of at least air and water therethrough.

In one or more embodiments, a battery comprises an anode, a cathode, an electrolyte, and a protection layer. The anode comprises a substantially pure metal selected from Group I and Group II materials, or mixtures of substantially pure metals selected from Group I and Group II materials. The protection layer is formed on the anode by atomic layer deposition, which covers the anode surface completely or as islands of protection material. The islands of protection material can be separated from each other by gaps. A solid-electrolyte interphase will be formed in the gaps by electrolyte reaction with the reactive metal anode, i.e., between the protection material islands, and thus inhibit transport of ions or electrolyte to or from the anode through the gaps. The protection layer islands can allow ions of the pure metal or metals to pass therethrough while inhibiting electron passage therethrough.

In one or more embodiments, a battery can comprise a self-healing anode structure, a cathode, and an electrolyte. The self-healing anode structure can comprise an anode and a protection layer on the anode formed by atomic layer deposition. The anode can be formed of a substantially pure metal selected from Group I and Group II materials, or mixtures of substantially pure metals selected from Group I and Group II materials. The electrolyte can contact the self-healing anode structure and the cathode. The protection layer can allow ions of the pure metal or metals to pass therethrough while inhibiting passage of electrons therethrough. Any gaps or cracks in the protection layer that develop during operation of the battery can be terminated by formation of a solid-electrolyte interphase in said gaps or cracks, such that primary ionic transport of the substantially pure metal or metals remains via the protection layer.

In one or more embodiments, an electrochemical electrode can comprise a structure and a protection layer. The structure can consist essentially of a pure metal or mixtures of pure metals, e.g., Li, Na, Mg, Al, or Ca. The protection layer can be formed on the structure by atomic layer deposition. The protection layer allows ions of the pure metal or metals to pass therethrough while inhibiting passage of at least air and water therethrough.

In one or more embodiments, a fabrication method, such as for a protection layer for an anode, comprises depositing a protection layer by atomic layer deposition (ALD) on an electrochemical electrode formed of a substantially pure metal selected from Group I and Group II materials, or mixtures of substantially pure metals selected from Group I and Group II materials.

In one or more embodiments, a fabrication method, such as for protecting an anode, comprises depositing a protection layer on a substrate by an atomic layer deposition process. The depositing the protection layer can include sequentially flowing lithium tert-butoxide (LiO$^t$Bu), an oxidant, trimethylphosphate (TMP), and nitrogen ($N_2$) into contact with the substrate.

Objects and advantages of embodiments of the disclosed subject matter will become apparent from the following description when considered in conjunction with the accompanying drawings.

BRIEF DESCRIPTION OF DRAWINGS

Embodiments will hereinafter be described with reference to the accompanying drawings, which have not necessarily been drawn to scale. Where applicable, some features may not be illustrated to assist in the illustration and description of underlying features. Throughout the figures, like reference numerals denote like elements.

FIGS. 5A-5B are images of a Li metal foil protected by a 14 nm ALD layer of $Al_2O_3$ prior to and after exposure to atmosphere at 25° C. and 40% relative humidity for 20 hours, respectively.

FIG. 6A is a graph of surface tarnish versus duration of exposure to atmosphere at 25° C. and 40% relative humidity for bare Li metal and Li metals protected by ALD layers of $Al_2O_3$ of various thicknesses.

FIG. 6B is a graph of evolution of $H_2$ gas versus duration of exposure to organic electrolyte for bare Li metal and Li metals protected by ALD layers of $Al_2O_3$ of various thicknesses.

FIG. 6C is a graph of onset time for tarnishing (exposed to air) and $H_2$ evolution (exposed to electrolyte) versus duration of exposure.

FIGS. 16A-16B are graphs of photoelectron emission current (intensity) versus electron binding energy (B.E.) for cycled Li anodes having ALD protection layers of $Al_2O_3$ and LiPON, respectively.

FIG. 17 is a graph comparing discharge capacity versus cycling for a bare Li anode, a Li anode protected by an ALD layer of $Al_2O_3$, and a Li anode protected by an ALD layer of LiPON.

FIGS. 18A-18B are simplified cross-sectional views showing the surface profile of a bare Li anode after low rate cycling and high rate cycling, respectively.

FIGS. 19A-19B are simplified cross-sectional views showing the surface profile of a Li anode protected by an ALD layer of LiPON after low rate cycling and high rate cycling, respectively.

FIGS. 20A-20B are SEM images of a bare Li anode and a Li anode protected by an ALD layer of LiPON, respectively, after high rate cycling.

FIGS. 21A-21B illustrate exemplary chemical models for hybrid LiPON protection layers with ethylene glycol and dimethyl sulfoxide, respectively, according to one or more embodiments of the disclosed subject matter.

DETAILED DESCRIPTION

Figure 1:
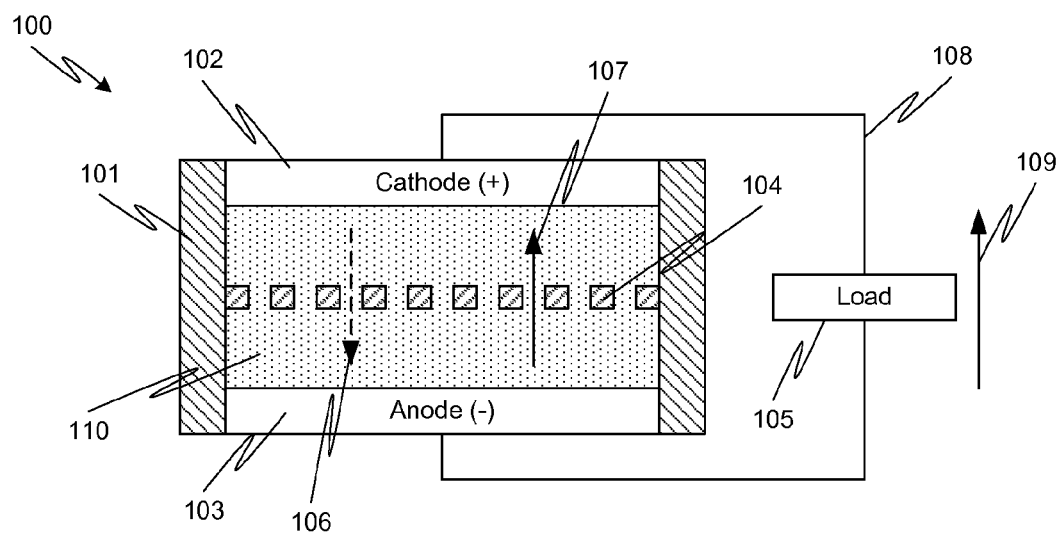
FIG. 1 is a simplified diagram illustrating basic elements of a battery, according to one or more embodiments of the disclosed subject matter.

Embodiments of the disclosed subject matter relate to protection of an electrochemical electrode, in particular, a metal anode, of an energy storage device or battery. Such a battery 100 is illustrated in simplified schematic form in FIG. 1. A case or housing 101 can support therein a cathode 102, an anode 103, a separator 104, and electrolyte 110. The cathode 102 and anode 103 can be spaced from each other, with at least the separator 104 and the electrolyte 110 therebetween. The electrolyte 110 can be in contact with the anode 103 and/or the cathode 102, although other layers or materials may be disposed between the anode 103/cathode 102 and the electrolyte 110 such that the electrolyte 110 is not in direct contact therewith. During discharging, the metal of anode 103 dissolves and is plated on the cathode 102. Thus, anions flow via the electrolyte 110 from the anode 103 through separator 104 to the cathode 102, as indicated at 107. Simultaneously, electrons flow through external circuit 108 to power load 105, as indicated at 109. During charging of the battery 100, the metal previously plated on the cathode 102 is dissolved and is returned to the anode 103. Thus, anions flow via the electrolyte 110 from the cathode 102 through separator 104 to the anode 103, as indicated at 106. The anions combine with electrons at the anode 103 to store energy at the anode 10.

The cathode 102 can comprise carbon (C), sulfur (S), oxygen (O), air, a metal oxide, or a metal sulfide. The electrolyte 110 can comprise an organic electrolyte, liquid electrolyte, a gel electrolyte, or a solid electrolyte. The anode 103 can comprise a substantially pure metal or mixture of substantially pure metals, for example, a substantially pure metal selected from Group I and Group II materials of the periodic table, or mixtures of substantially pure metals selected from Group I and Group II materials. In particular, the anode 103 can comprise a highly reactive material that would otherwise be dangerous or subject to corrosion in or during operation of the battery 100. In one or more embodiments, the anode 103 comprises substantially pure lithium (Li), sodium (Na), magnesium (Mg), aluminum (Al), calcium (Ca), or mixtures thereof. For example, in a Li—S battery, the cathode 102 can be S, the anode 103 can be substantially pure Li, and the electrolyte 110 can be a mixture of an organic liquid (e.g., ether) and a salt (e.g., $LiPF_6$). In another example, a Li-air battery can have a cathode 102 of air or $O_2$ gas, an anode 103 of substantially pure Li, and an electrolyte 110 that is liquid.

As used herein, substantially pure metal refers to metals that might include minor percentages (i.e., less than 10%) of dopants or impurities. Such dopants can include, but are not limited to, silicon (Si) doping or copper (Cu) doping of the metal, for example, to prevent electromigration. As used herein, mixtures of substantially pure metals refers to combinations of substantially pure metal that might include other materials that do not significantly affect the reactivity of the pure metals, so long as the other materials make up the minority of the mixture on an atom percent basis.

It is to be noted that the arrangement illustrated in FIG. 1 is a simplified arrangement for discussion purposes only, and that other battery arrangements are also possible according to one or more contemplated embodiments. For example, the battery 100 may have a comb-finger arrangement, where the cathode, anode, and separator are interdigitated, a cylindrical arrangement, where a planar sandwich of the cathode, anode, and separator are rolled into a cylinder, or any other arrangement.

Figure 2A:
FIG. 2A is an image of a lithium metal foil, without any protection film, immediately upon removal from an argon atmosphere.
Figure 2B:
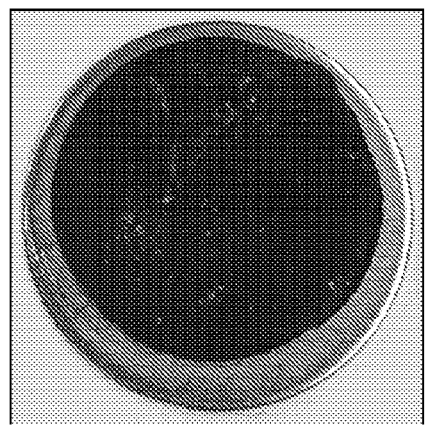
FIG. 2B is an image of the lithium metal foil of FIG. 2A after exposure to atmosphere at 25° C. and 40% relative humidity for 20 hours.

As noted above, one of the issues with using highly-reactive pure metal anodes is that exposure to atmospheric conditions can lead to oxidation and corrosion. For example, FIG. 2A is an image of a Li metal foil immediately upon removal from an argon atmosphere, while FIG. 2B is an image of the same Li metal foil after exposure to atmosphere at 25° C. and 40% relative humidity for 20 hours. The degradation of the Li metal due to the exposure is readily apparent.

Embodiments of the disclosed subject matter seek to mitigate this degradation, as well as improve performance, reliability, and/or manufacturing conditions by employing a thin protection layer on the anode formed by atomic layer deposition (ALD). ALD uses sequential exposure of a deposition surface to precursors (e.g., gaseous precursors) that react with the deposition surface in a self-limiting manner to form a desired film or layer thereon. ALD is uniquely suited to highly-reactive metal anode protection given its capabilities for angstrom-scale thickness control, pinhole-free conformal film formation, and relatively low temperature deposition (e.g., below 180° C., which is the melting point of Li). Although the term ALD is primarily used herein, the references to ALD are also meant to include molecular layer deposition (MLD) processes, which deposit a molecular fragment in a given precursor cycle.

Figure 3A:
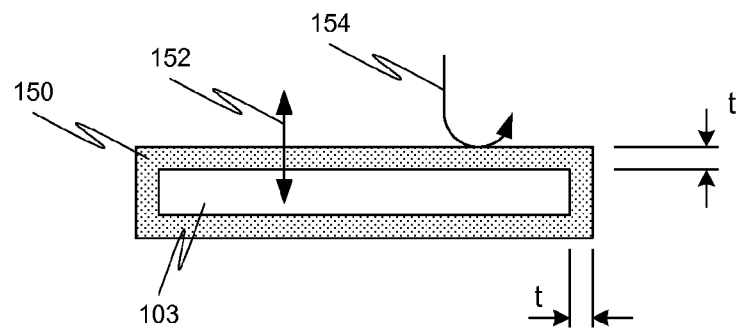
FIG. 3A is a simplified cross-sectional view of an anode with an atomic layer deposited (ALD) protection layer on all surfaces, according to one or more embodiments of the disclosed subject matter.

In one or more embodiments, the desired metal anode structure includes the metal anode 103 and a thin protection layer 150, as illustrated in FIG. 3A. As noted above, the anode 103 is formed of a pure metal selected from Group I and Group II materials, or mixtures of pure metals selected from Group I and Group II materials. Alternatively or additionally, the anode 103 is formed of a pure metal or mixture of pure metals selected from the group consisting of Li, Na, Mg, Al, and Ca. The anode 103 can be a self-supporting structure (e.g., a metal foil) or a film that is subsequently attached to another supporting structure after deposition of the protection layer. The protection layer 150 can be formed by ALD as a conformal coating on the metal anode 103, so as to cover all otherwise exposed surfaces of the metal anode 103. Alternatively, the ALD protection layer 150 may be formed on only some of the surfaces of the metal anode 103 (for example, see FIG. 3B). The protection layer 150 may have a thickness, t, of between 1 nm and 200 nm inclusive, for example, 5-200 nm.

As shown in FIG. 3A, the protection layer 150 can be formed directly on the anode 103 (i.e., in contact with the surface of the anode 103). Alternatively, an intermediate layer 160 can be between the protection layer 150 and the surface of the anode 103, so that the protection layer 150 is not in direct contact with the anode 103, as shown in FIG. 3C. The intermediate layer 160 can be, for example, a thin layer of native oxide of the metal or metals of the anode. Alternatively or additionally, the intermediate layer 160 can comprise other species that do not interfere with ion transport of the metal or metals of the anode. Alternatively or additionally, the intermediate layer 160 can be formed on the surface of the anode 103 by a process other than ALD, for one or more desired purposes. Although only an intermediate layer 160 is illustrated in FIG. 3C, multiple intermediate layers 160 are also possible according to one or more contemplated embodiment. Additionally or alternatively, one or more superior layers (not shown) can be formed on the ALD protection layer 150, generally by a process other than ALD, for one or more desired purposes.

The material of the ALD protection layer 150 can react with the metal or metals of the anode 103 to form a solid electrolyte. For example, when a protection layer 150 of $Al_2O_3$ is deposited on a substantially pure Li metal anode 103, cycling of the resulting battery causes lithiation of the $Al_2O_3$ to form a stable, ionically conductive solid electrolyte-$Li_xAl_2O_3$ alloy. Alternatively, the material of the ALD protection layer 150 forms a solid electrolyte upon deposition thereof. The protection layer 150 can comprise a metal oxide, a metal phosphate, or a hybrid inorganic-organic material. For example, the protection layer 150 comprises at least one of $Al_2O_3$, $TiO_2$, $V_2O_5$, $Li_3PO_4$, $Li_xPO_yN_z$ (LiPON), $Li_xAl_yTi_zP$ (LATP), and a metalcone, such as an alucone or a titanocone. The selection of the protection layer 150 material may be based on the specific battery chemistry employed, in particular, the material composition of the electrochemical electrodes and the electrolyte.

Figure 3B:
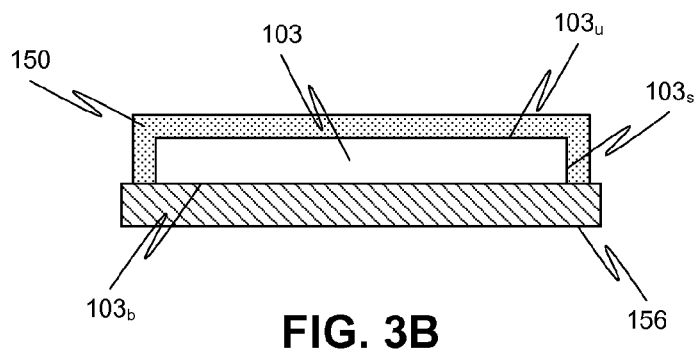
FIG. 3B is a simplified cross-sectional view of an anode on a support with an ALD protection layer on exposed surfaces, according to one or more embodiments of the disclosed subject matter.
Figure 3C:
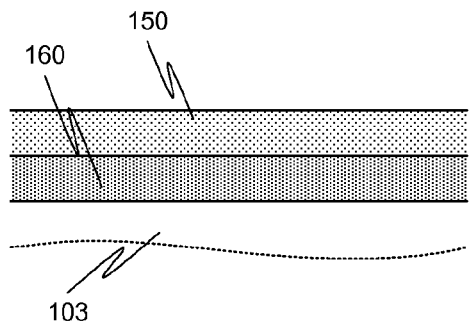
FIG. 3C is a simplified cross-sectional view of a portion of an anode with an intermediate layer, according to one or more embodiments of the disclosed subject matter.

In an alternative configuration to that of FIG. 3A, the anode 103 can be formed with its bottom surface 103b on a support 156 prior to deposition of the protection layer 150, as shown in FIG. 3B. The protection layer 150 can thus cover at least the other surfaces of the anode 103 otherwise exposed, i.e., upper surface 103u and side surfaces 103s. The protection layer 150 can also optionally cover portions of the surface of the support 156. The support 156 can be a substrate that is relatively more rigid than the anode material. For example, the support 156 can be a metalized plastic substrate. Again, although illustrated as a stacking of planar layers, other arrangements for the anode 103, the protection layer 150, and the support 156 are also possible according to one or more contemplated embodiments.

Figure 3D:
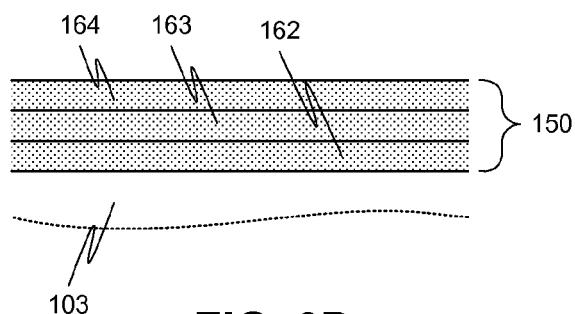
FIG. 3D is a simplified cross-sectional view of a portion of an anode with a laminate structure as an ALD protection layer, according to one or more embodiments of the disclosed subject matter.

Although a single protection layer 150 is illustrated in FIGS. 3A-3C, the protection layer 150 may comprise multiple sub-layers forming a single layer. Such a configuration is illustrated in FIG. 3D. In particular, the protection layer 150 includes a first sub-layer 162, a second sub-layer 163, and a third sub-layer 164. Although three sub-layers are shown, it is contemplated that fewer or additional sub-layers may be provided as well, and thus embodiments are not limited to a particular number of sub-layers. Each sub-layer may have a property and/or composition different from at least one other sub-layer. For example, the sub-layers 162-164 may be stacks of different materials to realize benefits of material combinations, defect minimization by multilayer configurations, etc. The sub-layers 162-164 may have different properties and/or compositions such that the overall protection layer 150 is considered to have a composition and/or property that varies in a thickness direction thereof. Such composition and/or properties may vary in a step-wise manner or in a substantially continuous manner (for example, see the discussion regarding FIGS. 22A-22B below).

The ALD protection layer 150 provides a barrier to air, water, and/or electrons, as illustrated schematically at 154 in FIG. 3A. However, the protection layer 150 allows ions of the pure metal or metals to pass therethrough, as illustrated schematically at 152 in FIG. 3A. By preventing direct contact of the anode metal surface with species that would otherwise cause degradation of the surface, the protection layer 150 ensures that the atoms of the metal or metals of the anode are oxidized in a reversible manner, rather than losing ions/electrons to highly stable, low ionic conductivity surface species.

Figure 4A:
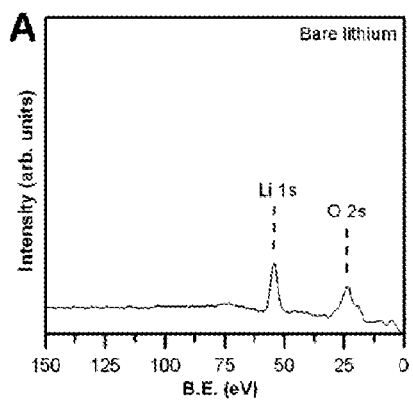
FIGS. 4A-4C are X-ray photoelectron spectra (XPS) of (A) uncycled pristine Li metal; (B) uncycled Li metal protected by a 5 nm ALD layer of $Al_2O_3$; and (C) uncycled Li metal protected by a 14 nm ALD layer of $Al_2O_3$.
Figure 4B:
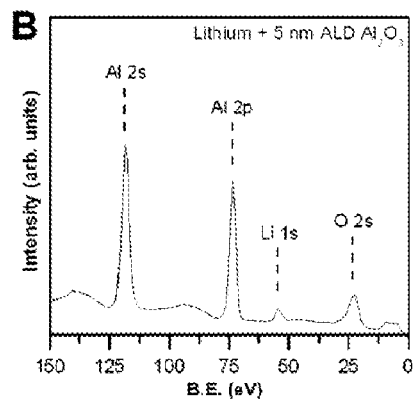
Figure 4C:
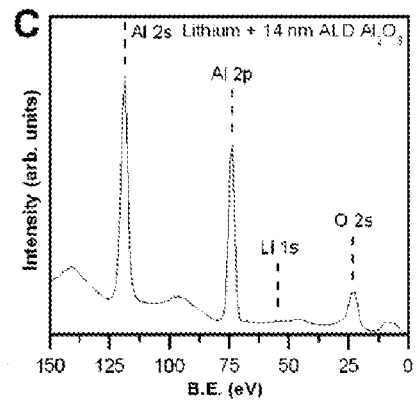

FIGS. 4A-4C compare X-ray photoelectron spectra (XPS) for a metal anode of Li without protection and with ALD protection layers. In particular, FIG. 4A shows XPS for an uncycled pristine Li metal anode, FIG. 4B shows XPS for uncycled Li metal anode protected by a 5 nm thick ALD protection layer of $Al_2O_3$, and FIG. 4C shows XPS for uncycled Li metal anode protected by a 14 nm thick ALD protection layer of $Al_2O_3$. The surface of the Li metal is covered with a native oxide as seen in the Li 1 s photoelectron peak in FIG. 4A. However, this peak is extinguished for a 14 nm thick ALD protection layer as shown in FIG. 4C, which only contains photoelectron peaks consistent with $Al_2O_3$. FIG. 4B shows that the 5 nm thick protection layer exhibits characteristic photoelectron peaks of both $Al_2O_3$ and Li metal. At 14 nm, the ALD protection layer is thicker than the escape depth of the photoelectrons. The lack of a Li 1 s peak after application of the $Al_2O_3$ layer indicates not only that the ALD coating is uniform and pinhole-free but also that the top ~8 nm of the layer does not lithiate during the ALD deposition process at 100° C.

To test the effect of ALD protection layers against atmospheric corrosion of Li metal by $H_2O$ and $CO_2$, pristine Li metal foil and Li metal foil protected by ALD protection layers were exposed to a controlled laboratory environment of 25° C. and 40% relative humidity (RH) for 20 hours. As illustrated in FIGS. 2A-2B, the unprotected Li metal foil experienced significant tarnishing from the 20 hour exposure. In contrast, there was little change in the surface appearance of a Li metal foil protected by a 14 nm thick ALD protection layer of $Al_2O_3$ from prior to exposure, as shown in FIG. 5A, to after the exposure, as shown in FIG. 5B.

Periodic photographs of the protected and unprotected Li metal surfaces were obtained over the course of the environmental exposure in order to calculate the amount of surface corrosion that had occurred. FIG. 6A tracks the percent of Li surface tarnishing as a function of air exposure time. As is apparent from FIG. 6A, the unprotected lithium metal begins tarnishing almost immediately after air exposure (i.e., less than 1 min), while those protected by a 14 nm ALD layer of $Al_2O_3$ can prevent the onset of surface tarnishing by at least 20 hours. Increased thicknesses would further delay the onset of measurable surface tarnishing as well as hinder the tarnishing rate once it begins.

To test the effect of ALD protection layers at preventing decomposition due to reactions with solvents, unprotected and protected Li metal foils were exposed to propylene carbonate (PC). Using differential quadrupole mass spectroscopy (dQMS), the byproduct of $H_2$ gas that evolved during the reaction of Li foils with PC was sampled to quantify the surface reaction of the electrolyte with the metal. FIG. 6B shows the measured $H_2$ partial pressure in the container headspace as a function of time for the unprotected and protected Li metal foils. As is apparent from FIG. 6B, the onset time of $H_2$ evolution is linearly proportional to the thickness of the ALD protection layer, indicating that contamination diffuses through the ALD layer to the Li metal. After onset of $H_2$ evolution for the protected metals, the resulting $H_2$ partial pressure in the headspace is an order of magnitude less than that of the unprotected metal, indicating that ALD protection also reduces the extent of anode degradation via parasitic reactions with the electrolyte.

Thus, the ALD protection layer both delays the onset of corrosion and hinders the corrosion reaction once it begins. This hindrance may be attributable to a "self-healing" mechanism in which the ALD protection layers contain defects, either through insufficient thickness to avoid pinholes or other defects or due to cycling induced cracks, which localize electrolyte decomposition reactions. However, once stable phases are formed at these defect sites, the corrosion reaction naturally to match that of the fully protected Li metal (see the further discussion below with respect to FIGS. 18A-19B).

FIG. 6C illustrates an extracted relationship between protection layer thickness and the degree of protection for both air and electrolyte exposure based on the above experiments. In particular, it is shown that an ALD protection layer of $Al_2O_3$ has an effective protection rate of approximately 1.8 hours per nm of thickness, whether the ALD protection layer is exposed to air or electrolyte. Thus, the duration of anode metal protection can be anticipated by careful tailoring of the ALD protection layer thickness.

To test the effect of ALD protection layers with respect to battery components (e.g., electrolyte and cathode materials), unprotected and protected Li metal foils were soaked in a solution of 1,2 dimethoxyethane (DME) and elemental S. Such conditions simulate a fully assembled Li—S battery in storage. Although the solubility of elemental S from the cathode in glyme-based electrolytes (commonly used in Li—S batteries) is relatively low, there may still be sufficient S in the electrolyte to induce metal anode corrosion. In such case, exposure of the anode metal to the S first forms long-chain soluble Li polysulfides (PS). Once long-chain PS are formed in the organic solvent solution, these PS are further reduced into short-chain PS and precipitate as insulating $Li_2S$ layer on the metal anode surface. While the bare metal surface experiences significant PS deposition that can negatively impact battery operation, the ALD-protected metal surface inhibits formation and deposition of such PS.

Figure 7A:
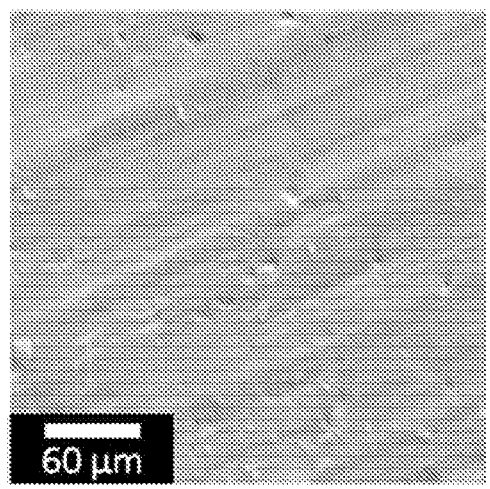
FIG. 7A is an SEM image of unprotected Li metal before electrolyte exposure.
Figure 7B:
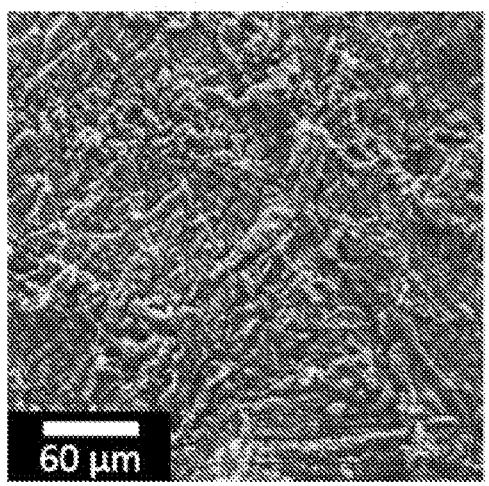
FIG. 7B is an SEM image of unprotected Li metal after 7 days of exposure to 1,2 dimethoxyethane (DME)/sulfur solution.
Figure 7C:
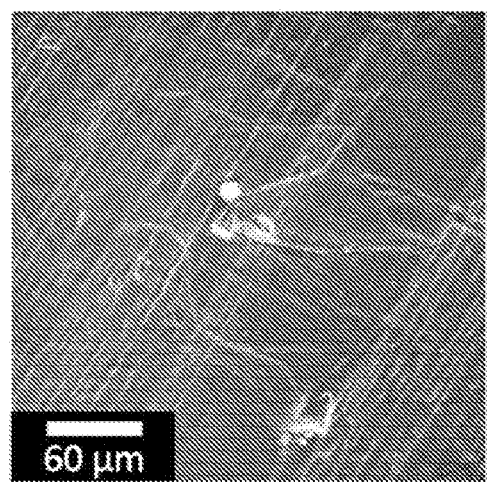
FIG. 7C is an SEM image of Li metal protected by 14 nm ALD layer of $Al_2O_3$ after 7 days of exposure to 1,2 dimethoxyethane (DME)/sulfur solution.

Scanning electron micrograph (SEM) images were also obtained of the unprotected and protected Li metal foils before and after exposure to the DME/S solution, as shown in FIGS. 7A-7C. In particular, FIG. 7A shows the surface of an unprotected Li metal before exposure to the DME/S solution, FIG. 7B shows the surface of the unprotected Li metal after 7 days of exposure to the DME/sulfur solution, and FIG. 7C shows the surface of a Li metal protected by a 14 nm thick ALD protection layer of $Al_2O_3$ after 7 days of exposure to the DME/S solution. As is readily apparent from a comparison of FIGS. 7A and 7B, the unprotected Li metal exhibits major morphological changes from the exposure. In contrast, the ALD-protected Li metal surface of FIG. 7C remains intact and relatively unchanged.

To test the effect of ALD protection layers during battery operating conditions, unprotected and protected Li metal anodes were assembled into corresponding batteries and subject to repeated cycles of charging and discharging. In particular, the Li metal anodes were combined with activated carbon cloth (ACC)/sulfur composite cathodes to form Li—S batteries in CR2032 coin cells. The long-term cycling performance (i.e., discharge capacity and Coulombic efficiency) of the resulting batteries is shown in FIGS. 8A-8B, where FIG. 8A shows performance for a battery without a protected Li anode and FIG. 8B shows performance for a battery with an Li anode protected by a 14 nm thick ALD protection layer of $Al_2O_3$.

Figure 8A:
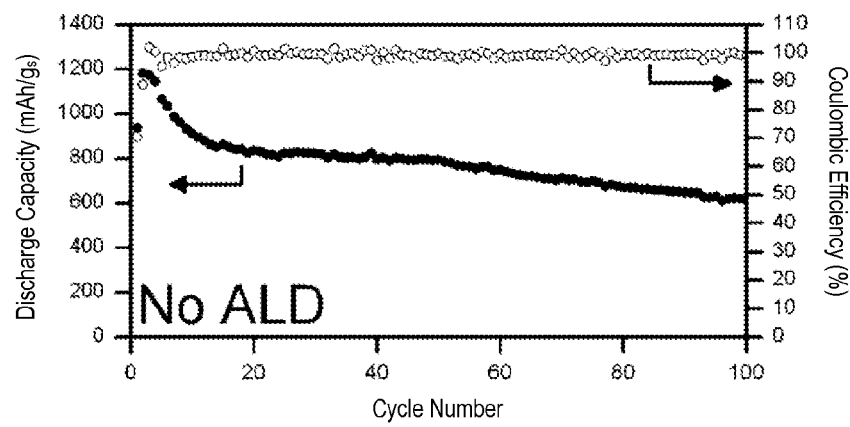
FIG. 8A is a graph of discharge capacity normalized to sulfur mass (solid circles, left axis) and Coulombic efficiency (open circles, right axis) versus charge/discharge cycle for an unprotected Li metal anode in a Li—S battery.
Figure 8B:
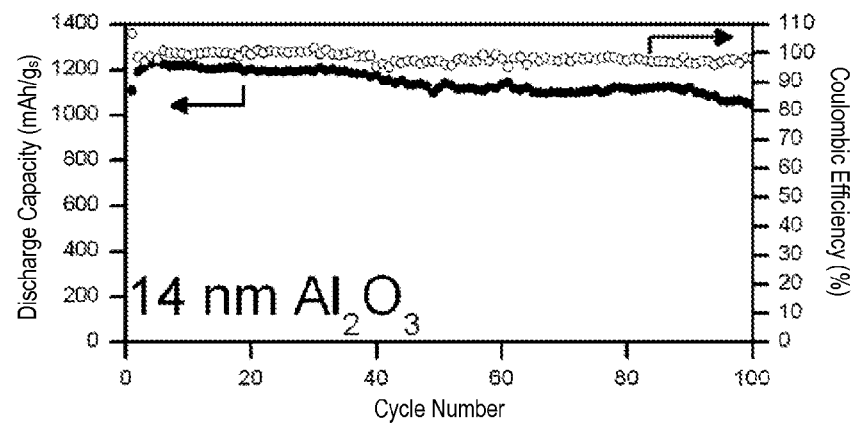
FIG. 8B is a graph of discharge capacity normalized to sulfur mass (solid circles, left axis) and Coulombic efficiency (open circles, right axis) versus charge/discharge cycle for a Li metal anode protected by a 14 nm ALD layer of $Al_2O_3$ in a Li—S battery.

For the unprotected metal anode, the first cycle of the battery yielded a lower capacity, as shown in FIG. 8A. This lowered capacity may be indicative of a self-discharge mechanism that reduces dissolved S species to PS on the anode surface even before the start of cycling and proceeds as a self-propagating reaction since the medium-chain PS can shuttle back to the cathode and reduce sulfur to long-chain PS. In addition to the initial decrease in cell capacity after the first cycle, cell capacity is further reduced as available S is consumed at the anode upon cycling, as illustrated in the decrease in cell capacity from ~1200 $mAh/g_s$ to ~800 $mAh/g_s$ after the first 10 cycles in FIG. 8A. In contrast, the battery with the protected anode does not exhibit such degradation, as shown in FIG. 8B. Rather, the ALD protection layer prevents self-discharge during the rest period before electrochemical cycling begins as well as preventing capacity loss during the first 10 cycles. Instead, the capacity of the protected anode battery cell falls only a negligible amount from ~1200 $mAh/g_s$ during the first 10 cycles, as shown in FIG. 8B. After 100 cycles, the battery cells with bare Li metal anodes lose nearly 50% of their initial capacity, while those with ALD-protected Li metal anodes have lost only ~10% of their initial capacity. Thus, ALD protection layers can increase both initial and long-term capacity of the battery cells.

Figure 9:
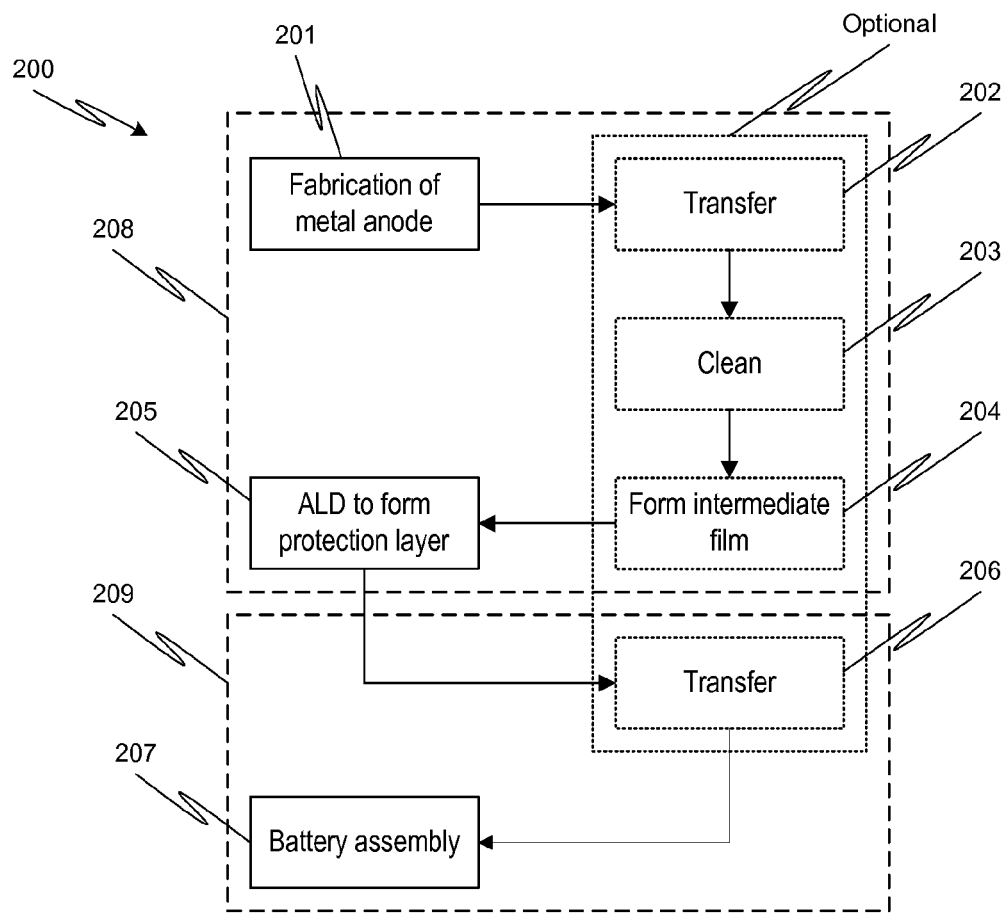
FIG. 9 is a process flow diagram of a generalized fabrication method for a battery with an anode protected by an ALD layer, according to one or more embodiments of the disclosed subject matter.

Embodiments of the disclosed subject matter include not only metal anodes protected by ALD protection layers and batteries including the same but also methods of fabricating the protected anode structure and resulting batteries. For example, FIG. 9 illustrates a process flow diagram of a generalized method 200 for fabricating a battery with a metal anode protected by an ALD protection layer. The generalized method 200 can include a step 201 of forming the anode of a substantially pure metal selected from Group I and Group II materials, or mixtures of substantially pure metals selected from Group I and Group II materials, or a substantially pure metal or mixture of metals selected from Li, Na, Mg, Al, and Ca, as described above. In particular, the metal anode can be formed as a foil or a thin film. For example, the metal anode can be formed as a thin film by evaporation or sputtering onto a metal or metalized substrate under vacuum in a fabrication chamber. Alternatively, the metal anode can be formed as a thin film by providing a substrate in an isothermal environment with an excess of the metal or metals in gaseous form, so that a steady state thickness of the metal or metals is achieved on exposed surfaces, including that of the anode substrate. In yet another alternative, the metal or metals of the anode can be extruded to form the foil. In still another alternative, the metal or metals can be melted onto a substrate to form a thin film. Other fabrication methods for forming the metal anode are also possible according to one or more contemplated embodiments. In some embodiments, the step 201 of forming the metal anode can include preparing the formed foil or film for subsequent processing, for example, by cutting the metal into a size and/or shape for ALD processing or for use in a specific battery housing.

In some embodiments, the step 201 of forming the metal anode can be performed in a different chamber or environment than the subsequent ALD in step 205. In such embodiments, the fabricated metal anode may optionally be transferred at 202 to a chamber or environment where ALD is performed, in order to preserve surface conditions of the metal anode until the ALD protection layer can be deposited. Battery manufacturing environments typically use dry rooms to handle highly-reactive metal anodes, such as Li, in order to minimize exposure of the anode surface to water, which rapidly degrades the anode surface. However, the presence of humans in a dry room ensures molecular $O_2$ exposure, as well as the potential for exposure to water, and thus degradation of the metal anode surface. Dry room environments also cannot prevent hydrocarbon and $CO_2$ exposure to the metal anode surface, which leads to other surface reaction products. Thus, the transfer of 202 to the ALD system can occur in an environment that is virtually free of water, $O_2$, $CO_2$, and hydrocarbons, to minimize degradation of the metal anode surface.

Such transfer 202 may be by way of separate transfer chamber, an inlet/outlet port connecting the anode fabrication chamber to the ALD chamber, or delivery between separate facilities. For example, the metal anode may be fabricated at a separate facility and delivered, for example, in a package or solution that protects the anode surface until it can be protected by ALD in step 205. In another example, a transfer chamber can be provided as an air lock or glove box between an anode fabrication chamber (e.g., a vacuum chamber for sputtering or evaporation) and an ALD chamber. In such configurations, the transfer chamber and/or the ALD chamber can have a chemically inert ambient environment (e.g., filled with argon (Ar) gas or other noble gas) or a vacuum environment. In another example, transfer can be effected by directly conveying the fabricated anode from the anode fabrication chamber to ALD chamber through a connecting port, for example, a slit or slot, without otherwise passing through a separate transfer chamber. In such configurations, the ALD chamber can have an inert ambient or vacuum environment.

Alternatively, in some embodiments, the step 201 of forming the metal anode can be performed in a same chamber or environment as the subsequent ALD in step 205, for example, in the same inert ambient or vacuum-based environment. In such embodiments, transfer at 202 may be unnecessary and can be omitted.

Since the metal anode may have native oxide or contaminants on the surface after fabrication 201, the process 200 can optionally include a step 203 of cleaning the metal anode surface in anticipation of ALD in step 205. For example, solvents or other cleaning mechanisms (e.g., plasma cleaning) can be used to clean the metal anode surface. In some embodiments, cleaning may be limited to surfaces of the metal anode subject to subsequent ALD, for example, top and side surfaces of the metal anode when formed with its bottom surface on a substrate. In the event that residue remains from the solvent or other cleaning mechanisms, such residues can be removed prior to ALD.

In some embodiments, prior to ALD in step 205, one or more intermediate layers can optionally be formed on the surface of the metal anode at step 204. Such intermediate layers can be formed by a process other than ALD, such as but not limited to evaporation, sputtering, chemical vapor deposition, and chemical surface treatment. Alternatively or additionally, the intermediate layer is already formed, for example, as a thin layer of oxide or other species that do not interfere with ion transport of the metal or metals of the anode. In such configurations, the forming step 204 can be omitted. Alternatively, no intermediate layer is formed and the protection layer is formed by ALD directly on and in contact with the surface of the metal anode. In such configurations, the forming step 204 can be omitted.

After fabrication of the metal anode at 201 and any optional procedures 202-204, the process 200 proceeds to 205 where ALD is used to form a protection layer on the anode, as described above. ALD can be carried out in a high vacuum environment, a low pressure environment (i.e., mTorr to a few Torr), or in an atmospheric pressure environment (e.g., with 1 atm of inert gas carrier, such as Ar or nitrogen ($N_2$) gas). In addition, ALD can be performed at relatively low temperatures (i.e., room temperature up to 300° C.).

Cycles of precursors in the ALD process can form a single layer for the protection layer, or cycles may be repeated to form a laminate of multiple sub-layers as the deposited protection layer. Alternatively or additionally, the ALD process can form a gradient layer or sub-layer, e.g., such that a composition or property thereof varies in a thickness direction thereof. Alternatively or additionally, the ALD process can form a hybrid inorganic-organic material, as described in further detail below with respect to FIGS. 21A-21B.

Once the protection layer is fully formed on the anode, the surface thereof is protected from corrosion due to atmospheric exposure and thus it can be removed from the strict environmental control otherwise required for handling such substantially pure metal or metals of the anode. Thus, processes 201-205 may be performed in one or more controlled environments (referred to generally at 208) to minimize exposure and resulting damage to the metal anode. In contrast, subsequent processes 206-207 can be performed in one or more less controlled environments (referred to generally at 209). Environments 209 may have environmental control conditions relaxed as compared to environments 208 with respect to pressure, humidity, particulate and/or atmospheric constituents. For example, environments 209 can have a higher humidity, higher particulate levels, and/or higher pressure than the environments 208.

After the metal anode is protected by the ALD protection layer, it can optionally be transferred at 206 from the ALD fabrication chamber or environment to a final assembly location. The transfer 206 can comprise delivering the metal anode from the ALD fabrication chamber in an ambient or inert ambient environment. More controlled environments can also be used during the transfer 206 to extend the amount of time between when the protected metal anodes are produced and when they are eventually incorporated into an assembled battery.

The process 200 then proceeds to 207, where the protected metal anode is assembled with appropriate cathode, electrolyte, and other components to form a battery. In conventional fabrication processes employing a highly-reactive metal anode, the incorporation of the anode into a final battery assembly would typically be processed in a dry room environment. However, since the metal anode is protected by the ALD protection layer, assembly at 207 can be performed under contamination control (e.g., humidity, $O_2$, $CO_2$, hydrocarbons) that is relaxed as compared to conventional dry room assembly environments. For example, the assembly 207 can be performed in an ambient environment or a conventional dry room with relaxed humidity control.

Figure 10:
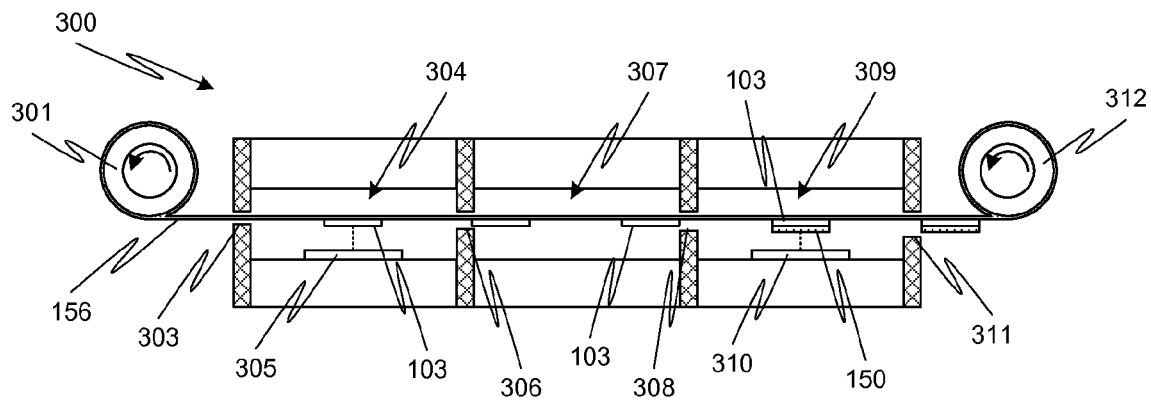
FIG. 10 is a diagram of a fabrication system employing roll to roll processing to form anode with ALD protection layer, according to one or more embodiments of the disclosed subject matter.

Various setups may be used to accomplish the process 200 of FIG. 9, according to one or more contemplated embodiments. For example, FIG. 10 illustrates a roll to roll processing setup 300 that can be used to fabricate a plurality of metal anodes 103 protected by respective ALD protection layers 150. A continuous substrate 156, such as a metalized substrate, can extend from an input roll 301, through various chambers 304, 307, 309, to an output roll 312. As input roll 301 unwinds and output roll 312 winds, portions of the continuous substrate 156 move through the various chambers in order, with the final formed and protected anode supported by the portions substrate 156 wound onto the output roll 312 for subsequent use or delivery.

In particular, the substrate 156 extends through an inlet slot 303 into a first chamber 304. The first chamber 304 may be a vacuum or low-pressure chamber for forming the anode 103 on the substrate 156 within the chamber 304. For example, the anode 103 may be formed by sputtering or evaporation, where material from the deposition head 305 is deposited on the substrate 156. Such deposition of the anode 103 may occur in discrete time steps, i.e., the substrate 156 stops temporarily while the anode 103 is deposited, or continuously, i.e., the substrate 156 continues to move as the anode material is deposited.

The substrate 156 may further extend through an inlet/outlet slot 306 connecting the first chamber 304 to an optional transfer chamber 307, through an inlet/outlet slot 308 connecting the optional transfer chamber 307 to a second chamber 309, and through an outlet slot 311 to output roll 312. In some embodiments, for example, when the first chamber 304 and the second chamber 309 are maintained under similar environments, the optional transfer chamber 307 may be omitted such that the first chamber 304 feeds directly into the second chamber 309. Alternatively, when the first chamber 304 and the second chamber 309 are maintained under substantially different environments (e.g., vacuum versus low pressure), the transfer chamber 307 may help to mitigate any deleterious effect of one environment on the other. In particular, the use of slots 303, 306, 308, 311 that are appropriately sized to the substrate 156 can provide relatively small leakage paths between connecting chambers such that differential pumping or differential purging arrangements can be used to isolate the environments in each chamber.

The second chamber 309 may be a chamber for performing ALD to form the protection layer 150 on the anode 103, as described above. For example, precursors from ALD deposition head 310 are sequentially flowed into contact with the anode 103 to form the desired protection layer 150. Such sequential flowing to form the protection layer 150 may occur in discrete time steps, i.e., the substrate 156 stops temporarily while precursors are sequentially flowed. Alternatively, the substrate 156 continues to move during ALD, for example, by using a spatial ALD head 350 as illustrated in FIG. 11.

Figure 11:
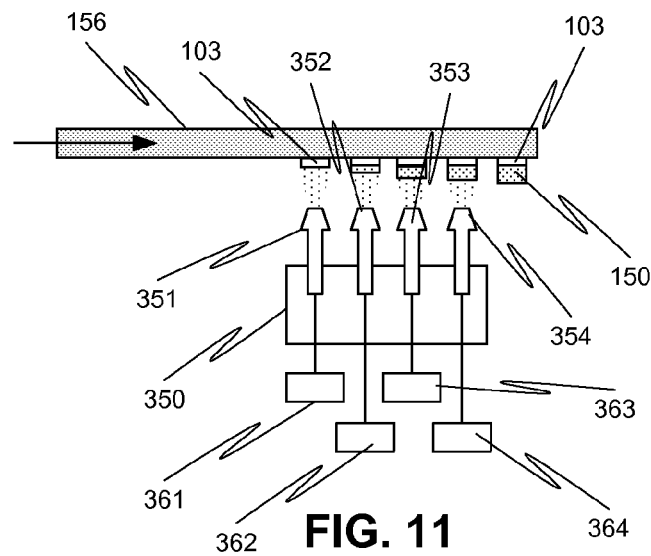
FIG. 11 is a simplified diagram of a spatial ALD setup that may be used in the setup of FIG. 10 or any other embodiment.

In FIG. 11, spatial ALD head 350 has individual deposition heads 351-354 (e.g., precursor gas injection nozzles) for delivering a respective precursor 361-364 to the substrate 156 and anode 103 as it continues to move through chamber 309. Thus, a particular anode 103 may be exposed to a different precursor as it moves to form the desired protection layer 150 thereon. Alternatively or additionally, the spatial ALD head 350 can be used to generate a spatially distributed pattern. For example, changes can be made to precursor flux as a function of space and time to form ALD protection layers 150 with different properties and/or compositions across the surface of the anode 103. Although four deposition heads 351-354 and four precursors 361-364 are illustrated in FIG. 11, fewer or additional nozzles and/or precursors are also possible according to one or more contemplated embodiments.

Although a particular arrangement of components has been illustrated in FIG. 10, such arrangement is not limiting. For example, the orientation of the rolls 301, 312 and deposition heads 305, 310 can be changed such that the deposition surface of the anode 103 faces upward rather than the illustrated downward. In another example, the progression of anodes 103 from the fabrication chamber 304 to the ALD chamber 309 can proceed from right to left rather than the illustrated left to right. One of ordinary skill in the art would readily appreciate that other variations are possible without departing from the spirit and scope of the disclosed subject matter.

Although particular fabrication techniques have been illustrated in FIG. 10, other techniques using a similar setup are also possible. For example, instead of forming discrete anodes 103 on substrate 156, a continuous anode film 103 with protection layer 150 thereon may be formed on the substrate and rolled onto output roll 312 for subsequent processing (e.g., dicing) into individual anodes. In another example, instead of using sputtering to form discrete anodes 103, a continuous sheet of metal anode material may be formed using extrusion and rolled onto input roll 301. In such a configuration, the input roll 301 may be maintained within a controlled environment to prevent degradation and chambers 304 and 307 may be omitted.

Figure 12:
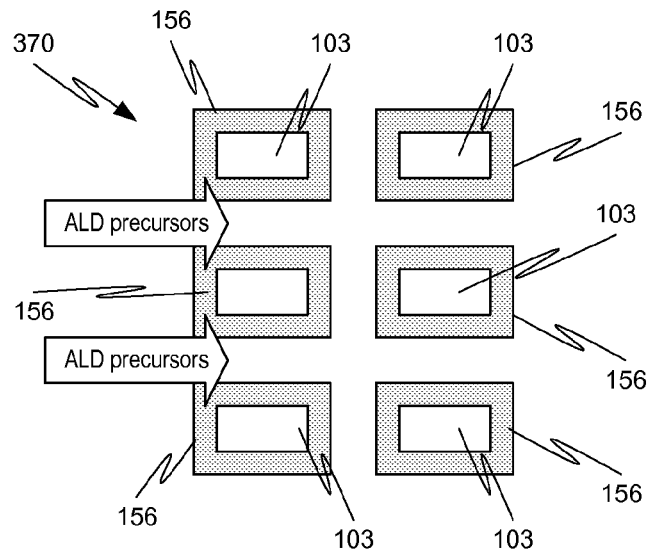
FIG. 12 is a simplified top view of an array of anodes subject to batch processing to form respective ALD protection layers thereon, according to one or more embodiments of the disclosed subject matter.

In another example, the process 200 of FIG. 9 can be accomplished using a batch fabrication process 370, such as illustrated in FIG. 12. Discrete anodes 103 can be separately fabricated, for example, by depositing a substantially pure metal (or mixture thereof) onto discrete substrates 156. Multiple anodes 103 can be loaded into an ALD chamber and simultaneously subjected to cycles of ALD precursors to form a respective protection layer 150 on each anode 103.

For example, the multiple anodes 103 can be loaded onto a tray or other conveyance for simultaneous loading to and unloading from the ALD chamber. Such loading and/or unloading may be accomplished manually or through robotic handlers.

Although particular fabrication techniques have been illustrated in FIG. 12, other techniques using a similar setup are also possible. For example, instead of using discrete anodes formed on substrate 156, a sheet of anode material can be formed on a sheet substrate 156 and batch processed to form the protection layer 150 for subsequent processing (e.g., dicing) into individual anodes. Alternatively or additionally, instead of using a substrate 156, the anode 103 may be self-supporting and the batch processing to form the protection layer 150 can be performed without such substrate 156.

As noted above, in any of the embodiments, the protection layer 150 can comprise a metal oxide, a metal phosphate, or a hybrid inorganic-organic material, for example, at least one of $Al_2O_3$, $TiO_2$, $V_2O_5$, $Li_3PO_4$, $Li_xPO_yN_z$ (LiPON), $Li_xAl_yTi_zP$ (LATP), and a metalcone, such as an alucone or a titanocone. Although many of the examples presented above focused on the use of $Al_2O_3$, the selection of the protection layer 150 material will be based on the specific battery chemistry employed, in particular, the material composition of the electrochemical electrodes and the electrolyte. Accordingly, embodiments are not limited to the use of $Al_2O_3$ as the protection layer.

Indeed, when using substantially pure Li as the material for the anode, ALD protection layers formed of LiPON may show superior performance as compared to $Al_2O_3$. For example, FIGS. 16A-16B show XPS high resolution spectra of the Al 2p and the P 2p photoelectron peaks, respectively, collected from the surface of a Li metal anode protected by a 14 nm thick $Al_2O_3$ protection layer and a 20 nm thick LiPON protection layer, respectively, after 100 charge-discharge cycles in a Li—S battery. Since the escape depth of photoelectrons is less than 10 nm, the results in FIGS. 16A-16B indicate that any SEI formed on the surface of the respective protection layer is less than 10 nm thick. Thus, both Al2O3 and LiPON provide a protective function against corrosion of the metal anode during operation. However, FIG. 17 compares discharge capacity versus cycling for bare Li metal anodes to Li metal anodes protected by $Al_2O_3$ or LiPON. As is readily apparent from the figure, Li metal anodes with a LiPON protection layer exhibits significantly better discharge capacity than either bare Li metal anode or Al2O3 protection Li metal anode. Accordingly, LiPON may be preferable to $Al_2O_3$ when using Li as the material for the anode.

Figure 13:
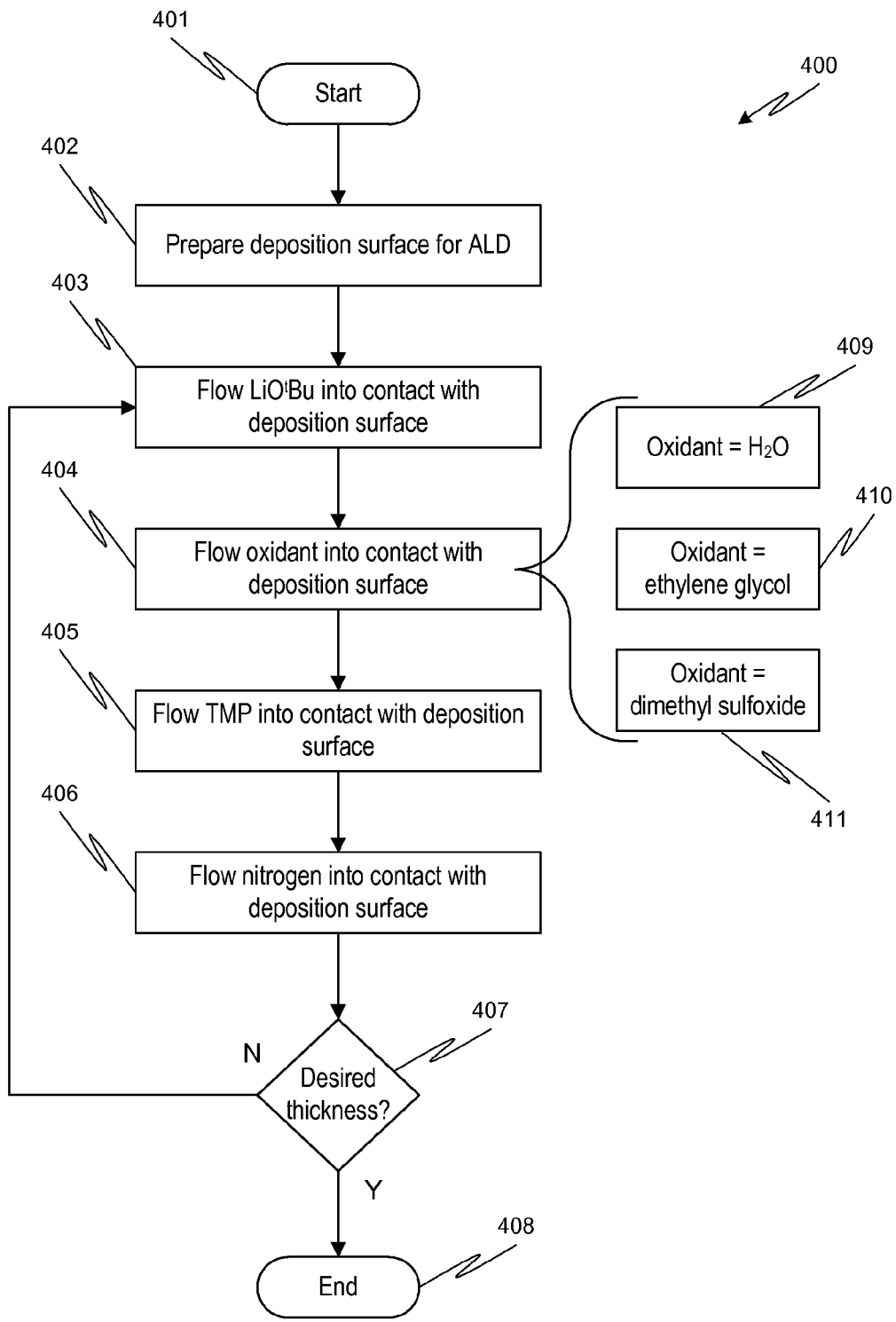
FIG. 13 is a process flow diagram for an ALD process to form a LiPON protection layer or hybrid LiPON protection layer, according to one or more embodiments of the disclosed subject matter.

FIG. 13 is a process flow diagram for an ALD process 400 that can be used to deposit LiPON or a hybrid LiPON protection layer. The process 400 can start at 401 and proceed to 402, where the surface of the substantially pure metal anode is prepared for ALD. Such preparation can include, but is not limited to, removing any native oxide present on the surface and cleaning the surface to remove any particulate or other contaminants thereon. For example, cleaning can be effected by using solvents or other cleaning mechanisms (e.g., plasma cleaning), such as by sequential rinsing with acetone, methanol, and isopropanol and/or drying of the surface using an $N_2$ blower. The deposition surface of the anode can also be prepared to have a hydroxyl-terminated surface, for example, by exposure to $H_2O$, $H_2O_2$, or atmosphere.

After preparation, the anode can be loaded into an appropriate chamber for ALD. Alternatively, in embodiments where anode fabrication and ALD are performed in the same chamber such loading may be omitted. For example, the ALD chamber may be a vacuum chamber having a reduced pressure. Alternatively, the ALD chamber may be an atmospheric ALD chamber, where the pressure is at or near atmospheric pressure. During the ALD process, the ALD chamber may be maintained at a temperature less than 300° C., for example, 250° C. In some embodiments, the ALD chamber may be maintained at a temperature that is less than a melting temperature of the metal or metals of the anode. For example, the ALC chamber may be maintained at a temperature less than 179° C. when the anode is made of Li.

The process 400 then proceeds to 403, where the surface of the anode is exposed to lithium tert-butoxide (LiO<sup>t</sup>Bu), e.g., by flowing LiO<sup>t</sup>Bu gaseous precursor into contact with the anode surface for a first time period. For example, the LiO<sup>t</sup>Bu precursor can be held at 165° C. and can be delivered to the ALD chamber using a bubbler with 40 sccm Ar carrier gas flow. After the first time period, a purge in preparation for the next precursor can be effected by flowing the carrier gas through the ALD chamber.

The process 400 then proceeds to 404, where the surface of the anode is exposed to an oxidant, e.g., by flowing a gaseous oxidant precursor into contact with the anode surface for a second time period. For example, when it is desired to form a layer or sub-layer of LiPON, the oxidant may be deionized $H_2O$ 409. Alternatively or additionally, when a hybrid LiPON layer or sub-layer is desired, the oxidant may be, for example, ethylene glycol 410 or dimethyl sulfoxide (DMSO) 411, as described in more detail below with respect to FIGS. 21A-22B. After the second time period, a purge in preparation for the next precursor can be effected by flowing the carrier gas through the ALD chamber.

The process 400 then proceeds to 405, where the surface of the anode is exposed to trimethylphosphate (TMP), e.g., by flowing TMP gaseous precursor into contact with the anode surface for a third time period. After the third time period, a purge in preparation for the next precursor can be effected by flowing the carrier gas through the ALD chamber.

The process 400 then proceeds to 406, where the surface of the anode is exposed to nitrogen, e.g., by flowing $N_2$ gas into contact with the anode surface for a fourth time period. The $N_2$ gas can be excited by a plasma discharge. For example, the $N_2$ gas can be flowed a rate of 40 sccm with a plasma power of 300 W. After the fourth time period, a purge in preparation for the next precursor can be effected by flowing the carrier gas through the ALD chamber.

The process 400 then proceeds to 407, where it is determined if the deposited layer has a desired thickness. In general, the final protection layer can have a thickness of between 1 nm and 200 nm, inclusive. Since the precursor steps 403-406 may result in a film growth rate on the order of Angstroms (Å) per second, e.g., approximately 1.05 Å/s, the precursor steps 403-406 may be repeated in order until the desired film thickness is achieved, after which the process 400 may terminate at 408. Alternatively or additionally, the precursor steps 403-406 can be repeated with variations in the precursor time periods and/or precursor constituents (e.g., using a different oxidant) to create a protection layer with different properties and/or composition in a thickness direction thereof. For example, by varying the fourth time period for the $N_2$ flowing of 406, the concentration of nitrogen in the protection layer can be varied.

The first time period can be on the order of seconds, for example, approximately 3 s. The second time period can be on the order of tens of milliseconds, for example, approximately 0.06 s. The third time period can be on the order of hundreds of milliseconds, for example, approximately 0.4 s. The fourth time period can be on the order of seconds to tens of seconds, for example, 5-30 s. Each of the purges can last for a time on the order of seconds, for example, approximately 1-30 s. The above noted time periods are exemplary only and should not be understood to be limiting of embodiments. Indeed, effective precursor and purge times will be system dependent, and variations and departures from the above noted times are within the scope of the disclosed subject matter.

Figure 14:
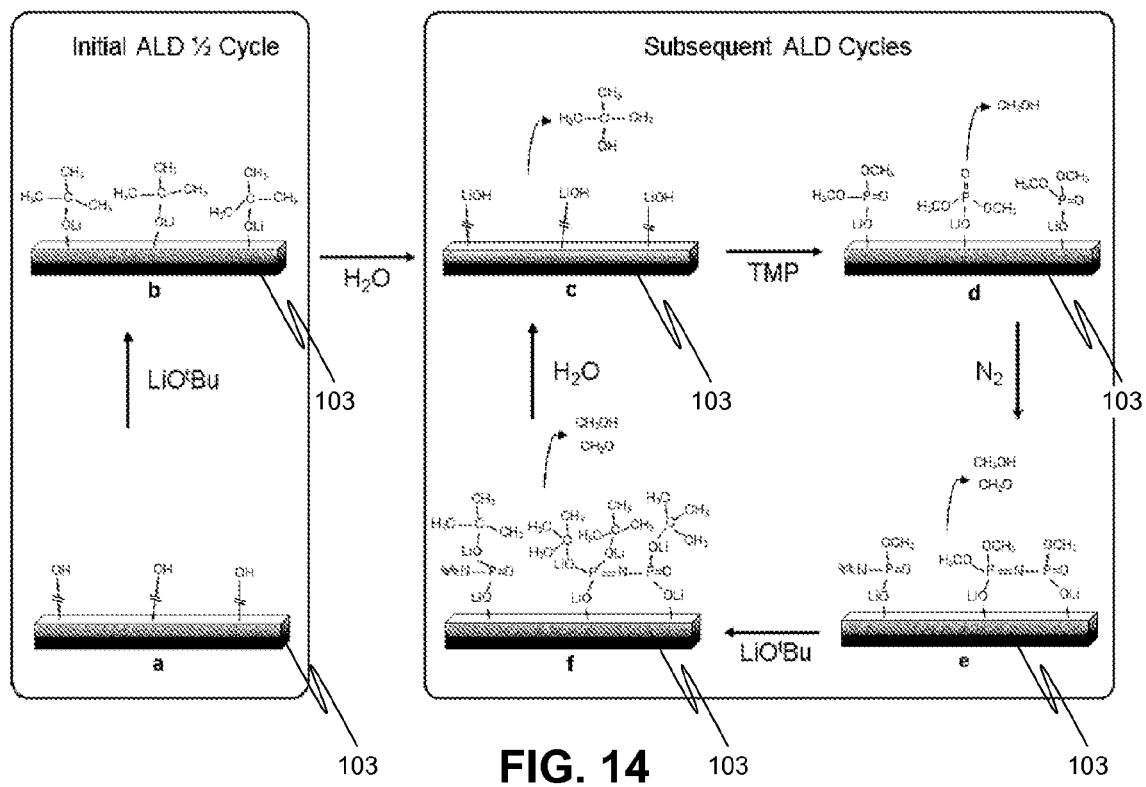
FIG. 14 is an exemplary chemical model and process flow diagram for forming an ALD protection layer of LiPON, according to one or more embodiments of the disclosed subject matter.

FIG. 14 illustrates a chemical model for formation of a protection layer using the LiPON ALD process of FIG. 13. Note that the chemical model set forth in FIG. 14 and discussed below is theoretical only and Applicant does not intend to be bound by such theory. However, the ALD process has been shown to result in formation of a LiPON layer with the protection properties disclosed herein. The process begins at (a) with a hydroxyl-terminated anode 103, which is then subjected to LiO$^t$Bu exposure to generate a metastable surface at (b). Exposure to an oxidant pulse of $H_2O$ removes the tert-butanol ligands and forms LiOH on the surface of the anode 103 at (c). A TMP pulse reacts with the LiOH surface through a ligand exchange reaction, evolving, $CH_3OH$ at (d). The subsequent $N_2$ plasma pulse cross-links phosphorus atoms and further evolves $CH_3OH$ and $CH_2O$ at (e). The initial LiO$^t$Bu and $H_2O$ pulses shown in (a) and (b) serve to activate the substrate for subsequent deposition. For all subsequent ALD cycles, the process chemistry in (c) through (f) is repeated as one ALD cycle.

Figure 15:
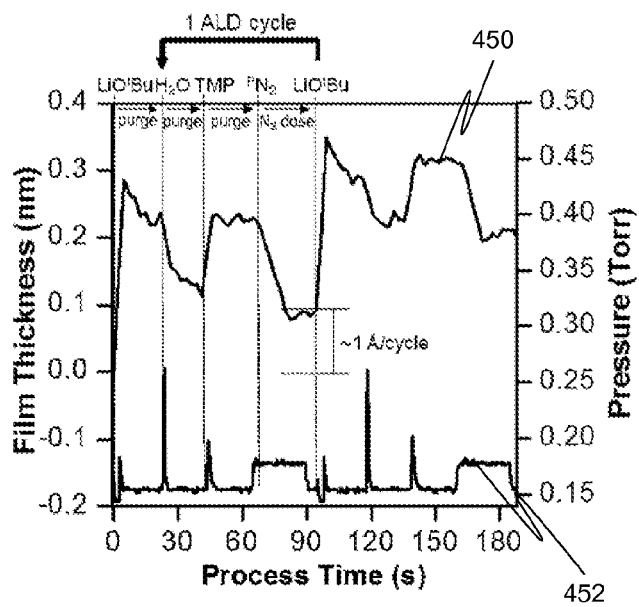
FIG. 15 is a graph of film thickness and pressure versus process time in an exemplary ALD process to form a LiPON protection layer.

FIG. 15 shows film thickness 450 and pressure changes 452 obtained during the disclosed LiPON ALD process. The changes in film thickness are generally in line with the mechanism proposed in FIG. 14. The addition of LiO$^t$Bu species to the surface leads to a thickness gain of approximately 0.3 nm, which is reduced somewhat during the purge period due to a combination of vaporization and decomposition. The measured thickness sharply decreases upon the addition of $H_2O$, which is consistent with a reaction liberating tert-butanol and leaving behind the smaller LiOH unit (FIG. 14, (b) to (c)). The addition of TMP again increases the thickness of the film consistent with a stable, surface bound methyl phosphate species. Finally, the application of a remote $N_2$ plasma coincides with a linear decrease of film thickness, which is consistent with the crosslinking reaction in FIG. 14, (d) to (e).

The $N_2$ plasma is a remote process and thus some high energy ions and neutrals may reach the deposited ALD film and etch the surface. However, observed overall growth rate has been positive for $N_2$ dose time periods less than or equal to 30 s. Changes in $N_2$ plasma duration can affect the structure of the final LiPON ALD layer. In particular, as the plasmas $N_2$ dose is increased, ALD films transition from polycrystalline $Li_3PO_4$ to amorphous LiPON. This transition point occurs near 4.5% N content, as ALD LiPON deposited with a 5 s pulse of plasma $N_2$ remains polycrystalline, while ALD LiPON deposited with a10 s pulse of plasma $N_2$ is amorphous. Moreover, increasing nitrogen content in the LiPON (e.g., by increasing the pulse duration of the plasma $N_2$) can increase ionic conductivity of the final deposited film. However, despite varying the duration of the plasma $N_2$ dose, growth rate of the ALD can remain relatively stable, for example, around 1.05 Å/cycle.

In embodiments, the resulting protection layer may have a different thermal coefficient of expansion than the underlying anode metal. Moreover, the protection layer may be harder and/or more brittle than the metal anode. Expansion/contraction during repeated cycling of the protected anode may lead to cracking in the protection layer, thereby resulting in islands of protection layer material separated by gaps. These gaps can allow electrolyte to reach the underlying anode surface.

Without any protection layer, metal ions 501 and electrolyte interact with the surface of the anode 103 to form a solid electrolyte interphase (SEI) 502 thereon, as illustrated in FIG. 18A. The SEI 502 inhibits further ion 501 passage to the anode 103, thereby decreasing performance. Moreover, repeated cycling, especially high rate cycling, further damages the surface of the anode, leading to the formation of dendrites 503 and growth of the SEI 502, as shown in FIG. 18B and FIG. 20A. Not only does the performance of the battery decrease due to the increasing SEI 502 thickness, but catastrophic failure of the battery may occur if the dendrites piece the separator of the battery.

In contrast, the protection layer 150 formed on the metal anode 103 inhibits SEI formation, thereby allowing ions 501 to flow uninhibited. However, when cracks or gaps 552 develop, the protection layer 150 becomes disjointed and forms separated islands 550, as shown in FIG. 19A and FIG. 20B. The gaps 552 become access points by which the electrolyte can interact with the underlying anode surface, thereby forming an SEI 502 in the gap 552. Repeated cycling, especially high rate cycling, leads to growth of the SEI 502 in the gap 552, as shown in FIG. 19B. Eventually the SEI 502 reaches a state where there is no further growth and any flow 510 of ions 501 therethrough is inhibited. Thus, the anode structure comprising the anode with protection layer thereon can be considered a self-healing anode structure, since any defects or gaps in the protection layer effectively terminate during operation such that primary transport of ions 501 remains substantially through the protection layer 150 (e.g., islands 550 of the protection layer) as opposed to the SEI 502 coated surfaces.

In some embodiments, protection layers formed of materials, such as LiPON and LATP, may be considered too hard or brittle for use in a particular application, despite the above described self-healing properties. For example, volume expansion/contraction during battery cycling can lead to cracking, delamination, or other failure modes in certain three-dimensional configurations. Since the underlying metal of the anode is highly reactive, such failure modes can raise significant safety and stability concerns. In such embodiments, the protection layer can be formed as a hybrid inorganic/organic material to thereby take advantage of the relative mechanical flexibility of organic/polymeric systems.

Such hybrid materials can be achieved using, for example, the ALD process of FIG. 13 to deposit molecular precursors (i.e., MLD), in particular, by substituting various organic linkers (e.g., ethylene glycol 410 or DMSO 411) instead of $H_2O$ to form hybrid nanolaminates and/or tuned gradient layers. Ethylene glycol can be used to replace $H_2O$ to form "metalcones" for various ALD oxides (e.g., $Al_2O_3$) and thus can also be inserted into ALD LiPON. A structure for a hybrid LiPON protection layer 150 formed on the anode 103 using ethylene glycol 410 instead of $H_2O$ 409 in the ALD process 400 is shown in FIG. 21A. DMSO may allow the introduction of S=O based bonds, which can aid in the development of poly-anionic materials and gel-based electrolytes. A structure for the hybrid LiPON protection layer 150 formed on the anode 103 using DMSO 411 instead of $H_2O$ 409 in the ALD process 400 is shown in FIG. 21B. It is to be noted that the chemistry illustrated in FIGS. 21A-21B is meant to be exemplary only, and variations of the chemistry are possible according to one or more contemplated embodiments. For example, rather than terminating the protection layer 150 with LiO'Bu, another material can be used, such as DMSO.

Figure 22A:
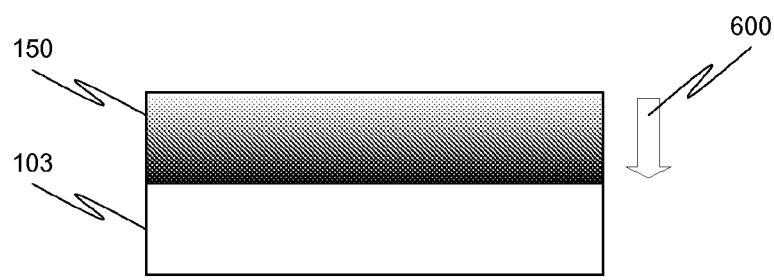
FIG. 22A is a simplified cross-sectional view of an anode with an ALD protection layer having gradient hybrid composition and/or properties, according to one or more embodiments of the disclosed subject matter.

In some embodiments, multiple oxidation precursors can be included in the same ALD process, for example, to form tuned protection layers. For example, the ALD process 400 could vary the oxidant used precursor pulse 404, or a composition thereof, such that mechanical and/or ionic properties of the resulting protection layer 150 has a gradient 600, as shown in FIG. 22A. Such gradient 600 may be tuned to meet the requirements of a particular anode structure or battery system. For example, the protection layer 150 can be made more flexible at an interface with the anode 103 surface and less flexible away from the anode 103 surface.

Figure 22B:
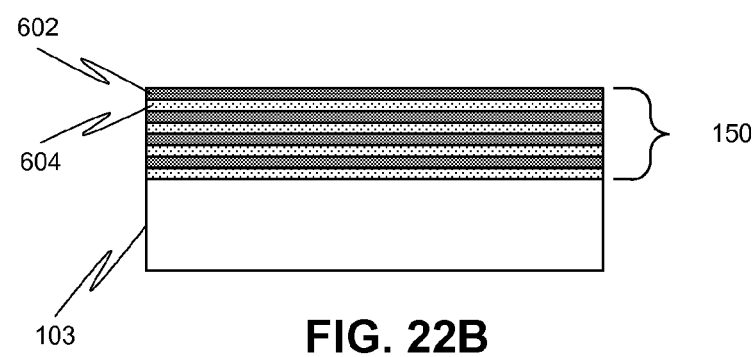
FIG. 22B is a simplified cross-sectional view of an anode with an ALD protection layer having a laminated hybrid structure, according to one or more embodiments of the disclosed subject matter.

In another example, the ALD process 400 could include a first number of cycles using $H_2O$ 409 as the oxidant followed by a second number of cycles using another oxidant, such as DMSO 411. The resulting protection layer can have properties that vary in a thickness direction, which properties may be optimized for mechanical and/or ionic transport performance. Subsequent cycles may alternate between the $H_2O$ 409 oxidant and the DMSO 411 to form a protection layer 150 with a nanolaminate structure, as illustrated in FIG. 22B, where hybrid LiPON sublayers 604 alternate with LiPON sublayers 602. Other variations in forming a hybrid inorganic-organic protection layer will be readily apparent to one of ordinary skill in the art and are within the scope of the present disclosure.

In one or more first embodiments, a battery comprises an anode, a cathode, an electrolyte, and a protection layer. The anode consists essentially of a pure metal (or is a substantially pure metal) selected from Group I and Group II materials, or mixtures of pure metals selected from Group I and Group II materials. The electrolyte is disposed between the anode and the cathode. The protection layer is formed on the anode by atomic layer deposition. The protection layer allows ions of the pure metal or metals to pass therethrough while inhibiting electron passage therethrough.

In the first embodiments or any other embodiment, the protection layer has a thickness of 1-200 nm, inclusive.

In the first embodiments or any other embodiment, the pure metal or metals of the anode includes one or more of Li, Na, Mg, Al, and Ca.

In the first embodiments or any other embodiment, the protection layer comprises a metal oxide, a metal phosphate, or a hybrid inorganic-organic material (e.g., a hybrid metal-organic metalcone).

In the first embodiments or any other embodiment, the protection layer comprises at least one of $Al_2O_3$, $TiO_2$, $V_2O_5$, $Li_3PO_4$, $Li_xPO_yN_z$ (LiPON), $Li_xAl_yTi_zP$ (LATP), an alucone, and a titanocone.

In the first embodiments or any other embodiment, the protection layer comprises a solid electrolyte.

In the first embodiments or any other embodiment, the protection layer comprises a material that reacts with the metal or metals of the anode to form a solid electrolyte.

In the first embodiments or any other embodiment, the protection layer is a single layer or a laminate of multiple layers.

In the first embodiments or any other embodiment, the protection layer has a composition or property that varies in a thickness direction thereof (i.e., is a graded composition).

In the first embodiments or any other embodiment, an intermediate layer is between the protection layer and the anode.

In the first embodiments or any other embodiment, the intermediate layer is a thin layer of oxide or other species that does not interfere with ion transport of the metal or metals of the anode.

In the first embodiments or any other embodiment, the intermediate layer is formed on the anode by a process other than atomic layer deposition.

In the first embodiments or any other embodiment, the protection layer is in contact with the anode.

In the first embodiments or any other embodiment, the cathode comprises carbon, sulfur, oxygen, air, a metal oxide, or a metal sulfide.

In the first embodiments or any other embodiment, the electrolyte comprises an organic electrolyte, liquid electrolyte, a gel electrolyte, or a solid electrolyte.

In the first embodiments or any other embodiment, the protection layer is a conformal coating over all surfaces of the anode otherwise exposed to the electrolyte.

In the first embodiments or any other embodiment, the anode is formed as a thin film with a lower surface thereof on a support, and the protection layer is a conformal coating over at least an upper surface of the thin film.

In the first embodiments or any other embodiment, the protection layer comprises islands separated from each other by gaps, and further comprising a solid electrolyte interphase formed in the gaps by interaction of the anode and the electrolyte such that primary ionic transport of the metal or metals of the anode is substantially through the protection layer islands.

In one or more second embodiments, an electrochemical electrode comprises a structure and a protection layer formed on the structure. The structure consists essentially of a pure metal selected from Group I and Group II materials, or mixtures of pure metals selected from Group I and Group II materials. The protection layer is formed on the structure by atomic layer deposition. The protection layer allows ions of the pure metal or metals to pass therethrough while inhibiting passage of at least air and water therethrough.

In the second embodiments or any other embodiment, the protection layer inhibits electron passage therethrough.

In the second embodiments or any other embodiment, the protection layer has a thickness of 1-200 nm, inclusive.

In the second embodiments or any other embodiment, the pure metal or metals of the structure includes one or more of Li, Na, Mg, Al, and Ca.

In the second embodiments or any other embodiment, the protection layer comprises a metal oxide, a metal phosphate, or a hybrid inorganic-organic material.

In the second embodiments or any other embodiment, the protection layer comprises at least one of $Al_2O_3$, $TiO_2$, $V_2O_5$, $Li_3PO_4$, $Li_xPO_yN_z$ (LiPON), $Li_xAl_yTi_zP$ (LATP), an alucone, and a titanocone.

In the second embodiments or any other embodiment, the protection layer comprises a solid electrolyte.

In the second embodiments or any other embodiment, the protection layer comprises a material that reacts with the metal or metals of the structure to form a solid electrolyte.

In the second embodiments or any other embodiment, the protection layer is a single layer or a laminate of multiple layers.

In the second embodiments or any other embodiment, the protection layer comprises at least one layer with a composition or property that varies in a thickness direction of the at least one layer.

In the second embodiments or any other embodiment, an intermediate layer is between the protection layer and the structure.

In the second embodiments or any other embodiment, the intermediate layer is a thin layer of oxide or other species that does not interfere with ion transport of the metal or metals of the structure.

In the second embodiments or any other embodiment, the intermediate layer is formed on the structure by a process other than atomic layer deposition.

In the second embodiments or any other embodiment, the protection layer is in contact with the structure.

In the second embodiments or any other embodiment, the protection layer is a conformal coating over all exposed surfaces of the structure.

In the second embodiments or any other embodiment, the structure is formed as a thin film with a lower surface thereof on a support, and the protection layer is a conformal coating over at least an upper surface of the thin film.

In one or more third embodiments, a battery comprises an anode, a cathode, an electrolyte, a protection layer, and a solid-electrolyte interphase. The anode comprises a substantially pure metal selected from Group I and Group II materials, or mixtures of substantially pure metals selected from Group I and Group II materials. The protection layer is formed on the anode by atomic layer deposition and comprises islands of protection material. The islands are separated from each other by gaps. The solid-electrolyte interphase is formed in the gaps between the protection material islands and inhibits transport of ions or electrolyte to or from the anode through the gaps. The protection layer islands allow ions of the pure metal or metals to pass therethrough while inhibiting electron passage therethrough.

In the third embodiments or any other embodiment, the protection layer has a thickness of 1-200 nm, inclusive.

In the third embodiments or any other embodiment, the substantially pure metal or metals of the anode includes one or more of Li, Na, Mg, Al, and Ca.

In the third embodiments or any other embodiment, the protection layer comprises a metal oxide, a metal phosphate, or a hybrid inorganic-organic material.

In the third embodiments or any other embodiment, the protection layer comprises at least one of $Al_2O_3$, $TiO_2$, $V_2O_5$, $Li_3PO_4$, $Li_xPO_yN_z$ (LiPON), $Li_xAl_yTi_zP$ (LATP), an alucone, and a titanocene.

In the third embodiments or any other embodiment, the protection layer comprises a solid electrolyte.

In the third embodiments or any other embodiment, the protection layer comprises a material that reacts with the metal or metals of the anode to form a solid electrolyte.

In the third embodiments or any other embodiment, the protection layer is a single layer or a laminate of multiple layers.

In the third embodiments or any other embodiment, the protection layer comprises at least one layer with a composition or property that varies in a thickness direction of the at least one layer.

In the third embodiments or any other embodiment, an intermediate layer is between the protection layer and the anode.

In the third embodiments or any other embodiment, the intermediate layer is a thin layer of oxide or other species that does not interfere with ion transport of the metal or metals of the anode.

In the third embodiments or any other embodiment, the intermediate layer is formed on the anode by a process other than atomic layer deposition.

In the third embodiments or any other embodiment, the protection layer is in contact with the anode.

In the third embodiments or any other embodiment, the cathode comprises carbon, sulfur, oxygen, air, a metal oxide, or a metal sulfide.

In the third embodiments or any other embodiment, the electrolyte comprises an organic electrolyte, liquid electrolyte, a gel electrolyte, or a solid electrolyte.

In one or more fourth embodiments, a battery comprises a self-healing anode structure, a cathode, and an electrolyte. The self-healing anode structure comprises an anode and a protection layer formed thereon. The anode is formed of a substantially pure metal selected from Group I and Group II materials, or mixtures of substantially pure metals selected from Group I and Group II materials. The protection layer is formed by atomic layer deposition. The electrolyte contacts the self-healing anode structure and the cathode. The protection layer allows ions of the pure metal or metals to pass therethrough while inhibiting passage of electrons therethrough. Any gaps or cracks in the protection layer that develop during operation of the battery are terminated by formation of a solid-electrolyte interphase in said gaps or cracks, such that primary ionic transport of the substantially pure metal or metals remains via the protection layer.

In the fourth embodiments or any other embodiment, the protection layer has a thickness of 1-200 nm, inclusive.

In the fourth embodiments or any other embodiment, the substantially pure metal or metals of the anode includes one or more of Li, Na, Mg, Al, and Ca.

In the fourth embodiments or any other embodiment, the protection layer comprises a metal oxide, a metal phosphate, or a hybrid inorganic-organic material.

In the fourth embodiments or any other embodiment, the protection layer comprises at least one of $Al_2O_3$, $TiO_2$, $V_2O_5$, $Li_3PO_4$, $Li_xPO_yN_z$ (LiPON), $Li_xAl_yTi_zP$ (LATP), an alucone, and a titanocene.

In the fourth embodiments or any other embodiment, the protection layer comprises a solid electrolyte.

In the fourth embodiments or any other embodiment, the protection layer comprises a material that reacts with the metal or metals of the anode to form a solid electrolyte.

In the fourth embodiments or any other embodiment, the protection layer is a single layer or a laminate of multiple layers.

In the fourth embodiments or any other embodiment, the protection layer comprises at least one layer with a composition or property that varies in a thickness direction of the at least one layer.

In the fourth embodiments or any other embodiment, an intermediate layer is between the protection layer and the anode.

In the fourth embodiments or any other embodiment, the intermediate layer is a thin layer of oxide or other species that does not interfere with ion transport of the metal or metals of the anode.

In the fourth embodiments or any other embodiment, the intermediate layer is formed on the anode by a process other than atomic layer deposition.

In the fourth embodiments or any other embodiment, the protection layer is in contact with the anode.

In the fourth embodiments or any other embodiment, the cathode comprises carbon, sulfur, oxygen, air, a metal oxide, or a metal sulfide.

In the fourth embodiments or any other embodiment, the electrolyte comprises an organic electrolyte, liquid electrolyte, a gel electrolyte, or a solid electrolyte.

In the fourth embodiments or any other embodiment, the protection layer is a conformal coating over all surfaces of the anode otherwise exposed to the electrolyte.

In the fourth embodiments or any other embodiment, the self-healing anode structure comprises a support on which the anode is formed, and the protection layer is a conformal coating over at least an upper surface of the anode.

In one or more fifth embodiments, a fabrication method comprises depositing a protection layer by atomic layer deposition (ALD) on an electrochemical electrode formed of a substantially pure metal selected from Group I and Group II materials, or mixtures of substantially pure metals selected from Group I and Group II materials.

In the fifth embodiments or any other embodiment, the method further comprises, prior to the depositing, forming the electrochemical electrode as a foil or film.

In the fifth embodiments or any other embodiment, the forming the electrochemical electrode comprises evaporation or sputtering onto a substrate under vacuum in a fabrication chamber.

In the fifth embodiments or any other embodiment, the forming the electrochemical electrode comprises at least one of: providing a substrate in an isothermal environment with an excess of the metal or metals in gaseous form; extruding the metal or metals to make the foil; and melting the metal or metals onto a substrate.

In the fifth embodiments or any other embodiment, the method further comprises, after the forming but prior to the depositing, transferring the electrochemical electrode from a fabrication chamber to an ALD chamber via an inert or vacuum environment.

In the fifth embodiments or any other embodiment, the inert environment is substantially free of water, oxygen, carbon dioxide, and hydrocarbons or is filled with an inert gas.

In the fifth embodiments or any other embodiment, the electrochemical electrode is formed on a roll and the transferring is by winding of the roll to displace the formed electrochemical electrode from the fabrication chamber to the ALD chamber.

In the fifth embodiments or any other embodiment, the roll extends through entry/exit slots between each chamber.

In the fifth embodiments or any other embodiment, the forming and the depositing are performed in the same fabrication chamber under vacuum.

In the fifth embodiments or any other embodiment, the method further comprises, prior to the depositing, cleaning surfaces of the electrochemical electrode to remove any native oxide or contaminants.

In the fifth embodiments or any other embodiment, the method further comprises, after the depositing, transporting the electrochemical electrode with the protection layer in an ambient environment.

In the fifth embodiments or any other embodiment, the method further comprises, after the depositing, assembling the electrochemical electrode with the protection layer together with a cathode and an electrolyte to form a battery.

In the fifth embodiments or any other embodiment, the assembling is performed in an ambient environment.

In the fifth embodiments or any other embodiment, the assembling is performed in an environment with conditions relaxed from what would otherwise be possible without the protection layer. For the example, the assembling is performed in an ambient environment or a dry room with relaxed dryness specification (i.e., closer to ambient humidity), rather than a conventional dry room or conventional clean room.

In the fifth embodiments or any other embodiment, the assembling is performed is a different environment than the forming of the electrochemical electrode and/or the ALD. For example, the different environment has higher humidity, higher particulate levels, and/or higher pressure than the environment for the forming of the electrochemical electrode and/or the environment for the ALD.

In the fifth embodiments or any other embodiment, the ALD is at least one of high vacuum based ALD, atmospheric pressure ALD with an inert gas carrier, and spatial ALD where precursor gas injection nozzles form a spatially distributed pattern.

In the fifth embodiments or any other embodiment, the deposited protection layer has a thickness of 1-200 nm, inclusive.

In the fifth embodiments or any other embodiment, the substantially pure metal or metals of the electrochemical electrode includes one or more of Li, Na, Mg, Al, and Ca.

In the fifth embodiments or any other embodiment, the protection layer comprises a metal oxide, a metal phosphate, or a hybrid inorganic-organic material.

In the fifth embodiments or any other embodiment, the protection layer comprises at least one of $Al_2O_3$, $TiO_2$, $V_2O_5$, $Li_3PO_4$, $Li_xPO_yN_z$ (LiPON), $Li_xAl_yTi_zP$ (LATP), an alucone, and a titanocone.

In the fifth embodiments or any other embodiment, the depositing is such that a laminate of multiple layers is deposited as the protection layer.

In the fifth embodiments or any other embodiment, the depositing is such that a composition or property of the protection layer varies in a thickness direction thereof.

In the fifth embodiments or any other embodiment, an intermediate layer is between the deposited protection layer and the electrochemical electrode.

In the fifth embodiments or any other embodiment, the intermediate layer is a thin layer of oxide or other species that does not interfere with ion transport of the metal or metals of the electrochemical electrode.

In the fifth embodiments or any other embodiment, the method further comprises, prior to the depositing the protection layer, forming the intermediate layer on the electrochemical electrode.

In the fifth embodiments or any other embodiment, the forming the intermediate layer is by a process other than atomic layer deposition.

In the fifth embodiments or any other embodiment, the protection layer is deposited in contact with the electrochemical electrode.

In one or more sixth embodiments, a fabrication method comprises depositing a protection layer on a substrate by an atomic layer deposition process. The atomic layer deposition process comprises (a) flowing a lithium tert-butoxide (Li-O$^t$Bu) into contact with the substrate; (b) flowing an oxidant into contact with the substrate; (c) flowing trimethylphosphate (TMP) into contact with the substrate; and (d) flowing nitrogen ($N_2$) into contact with the substrate.

In the sixth embodiments or any other embodiment, the oxidant in (b) comprises deionized water ($H_2O$).

In the sixth embodiments or any other embodiment, the deposited protection layer comprises a LiPON layer.

In the sixth embodiments or any other embodiment, the oxidant in (b) comprises ethylene glycol or dimethyl sulfoxide.

In the sixth embodiments or any other embodiment, the deposited protection layer comprises a hybrid LiPON layer.

In the sixth embodiments or any other embodiment, the substrate has a hydroxyl-terminated surface on which the protection layer is deposited In the sixth embodiments or any other embodiment, (a)-(d) are repeated to yield a desired thickness for the deposited protection layer.

In the sixth embodiments or any other embodiment, the deposited protection layer has a thickness of 1-200 nm, inclusive.

In the sixth embodiments or any other embodiment, in repeating (a)-(d), variations are introduced such that a composition or property of the deposited protection layer varies in a thickness direction thereof.

In the sixth embodiments or any other embodiment, one or more of the flowing in (a)-(d) is with a carrier gas comprising a noble gas, such as argon, or nitrogen.

In the sixth embodiments or any other embodiment, the depositing is performed at a temperature less than or equal to 300° C.

In the sixth embodiments or any other embodiment, the depositing is effective to provide a conformal coating of the protection layer on the substrate.

In the sixth embodiments or any other embodiment, a concentration of nitrogen in the deposited protection layer can be tuned by varying a duration of the flowing nitrogen in (d).

In the sixth embodiments or any other embodiment, the substrate is formed of a substantially pure metal selected from Group I and Group II materials, or mixtures of substantially pure metals selected from Group I and Group II materials.

In the sixth embodiments or any other embodiment, the substantially pure metal or metals of the electrochemical electrode includes one or more of Li, Na, Mg, Al, and Ca.

In the sixth embodiments or any other embodiment, the atomic layer deposition process (ALD) is at least one of high vacuum based ALD, atmospheric pressure ALD with an inert gas carrier, and spatial ALD where precursor gas injection nozzles form a spatially distributed pattern.

In the sixth embodiments or any other embodiment, an intermediate layer is between the deposited protection layer and the substrate.

In the sixth embodiments or any other embodiment, the intermediate layer is a thin layer of oxide or other species that does not interfere with ion transport of metal or metals of the substrate.

In the sixth embodiments or any other embodiment, the method further comprises, prior to the depositing the protection layer, forming the intermediate layer on the substrate.

In the sixth embodiments or any other embodiment, the forming the intermediate layer is by a process other than atomic layer deposition.

In the sixth embodiments or any other embodiment, the protection layer is deposited in contact with the substrate.

In the sixth embodiments or any other embodiment, (d) comprises flowing nitrogen ($N_2$) gas into contact with the substrate, with the nitrogen gas excited in a plasma discharge.

In one or more seventh embodiments, an electrochemical electrode comprises a structure and a protection layer. The structure can consist essentially of a pure metal or mixtures of pure metals. The protection layer can be formed on the structure by atomic layer deposition. The protection layer can allow ions of the pure metal or metals to pass therethrough while inhibiting passage of at least air and water therethrough.

In the seventh embodiments or any other embodiment, the metal is a substantially pure metal selected from Group I and Group II materials, or the mixture is a mixture of substantially pure metals selected from Group I and Group II materials In the seventh embodiments or any other embodiment, the electrochemical electrode serves as an anode.

In the seventh embodiments or any other embodiment, the protection layer inhibits electron passage therethrough.

In the seventh embodiments or any other embodiment, the protection layer has a thickness of 1-200 nm, inclusive.

In the seventh embodiments or any other embodiment, the pure metal or metals of the structure includes one or more of Li, Na, Mg, Al, and Ca.

In the seventh embodiments or any other embodiment, the protection layer comprises a metal oxide, a metal phosphate, or a hybrid inorganic-organic material.

In the seventh embodiments or any other embodiment, the protection layer comprises at least one of $Al_2O_3$, $TiO_2$, $V_2O_5$, $Li_3PO_4$, $Li_xPO_yN_z$ (LiPON), $Li_xAl_yTi_z$ P (LATP), an alucone, and a titanocone.

In this application, unless specifically stated otherwise, the use of the singular includes the plural and the use of "or" includes "and/or." Furthermore, use of the terms "including" or "having," as well as other forms, such as "includes," "included," "has," or "had" is not limiting. Any range described herein will be understood to include the endpoints and all values between the endpoints. Whenever "substantially," "approximately," "essentially," "near" or similar language is used herein in combination with a specific value, variations up to and including 10% of that value are included, unless explicitly stated otherwise.

Furthermore, the foregoing descriptions apply, in some cases, to examples generated in a laboratory, but these examples can be extended to production techniques. For example, where quantities and techniques apply to the laboratory examples, they should not be understood as limiting. In addition, although specific chemicals and materials have been disclosed herein, other chemicals and materials may also be employed according to one or more contemplated embodiments.

Features of the disclosed embodiments may be combined, rearranged, omitted, etc., within the scope of the invention to produce additional embodiments. Furthermore, certain features may sometimes be used to advantage without a corresponding use of other features.

It is thus apparent that there is provided in accordance with the present disclosure, ALD for metal anode protection layers, and system, methods, and devices for use or fabrication thereof. Many alternatives, modifications, and variations are enabled by the present disclosure. While specific embodiments have been shown and described in detail to illustrate the application of the principles of the present invention, it will be understood that the invention may be embodied otherwise without departing from such principles. Accordingly, Applicant intends to embrace all such alternatives, modifications, equivalents, and variations that are within the spirit and scope of the present invention.

The invention claimed is:

1. A battery comprising:
   an anode formed as a foil or film and consisting essentially of a pure metal selected from Group I materials, or mixtures of pure metals selected from Group I materials;
   a cathode;
   an electrolyte disposed between the anode and the cathode; and a protection layer formed by atomic layer deposition on all surfaces of the anode that would otherwise be exposed to the electrolyte, wherein the protection layer allows ions of the pure metal or metals to pass therethrough while inhibiting electron passage therethrough.

2. The battery of claim 1, wherein the pure metal or metals of the anode includes one or more of Li and Na, and wherein the protection layer comprises a metal oxide, a metal phosphate, or a hybrid inorganic-organic material.

3. The battery of claim 2, wherein the protection layer comprises at least one of $Al_2O_3$, $TiO_2$, $V_2O_5$, $Li_3PO_4$, $Li_xPO_yN_z$ (LiPON), $Li_xAl_yTi_zP$ (LATP), an alucone, and a titanocone.

4. The battery of claim 1, wherein the protection layer comprises a solid electrolyte or a material that reacts with the metal or metals of the anode to form a solid electrolyte.

5. The battery of claim 1, wherein the cathode comprises carbon, sulfur, oxygen, air, a metal oxide, or a metal sulfide, and wherein the electrolyte comprises an organic electrolyte, liquid electrolyte, a gel electrolyte, or a solid electrolyte.

6. The battery of claim 1, wherein:

the pure metal or metals of the anode includes one or more of Li and Na, the cathode comprises oxygen or air, the protection layer comprises at least one of $Li_3PO_4$, $Li_xPO_yN_z$ (LiPON), and $Li_xAl_yTi_zP$ (LATP), and the electrolyte comprises a gel electrolyte or a solid electrolyte.

7. An electrochemical electrode comprising:

a structure formed as a foil or film and consisting essentially of a pure metal selected from Group I materials, or mixtures of pure metals selected from Group I materials; and a protection layer formed by atomic layer deposition on all surfaces of the structure that would otherwise be exposed, wherein the protection layer allows ions of the pure metal or metals to pass therethrough while inhibiting passage of at least air and water therethrough.

8. The electrochemical electrode of claim 4, wherein the protection layer inhibits electron passage therethrough.

9. The electrochemical electrode of claim 4, wherein the pure metal or metals of the structure includes one or more of Li and Na, and wherein the protection layer comprises a metal oxide, a metal phosphate, or a hybrid inorganic-organic material.

10. The electrochemical electrode of claim 9, wherein the protection layer comprises at least one of $Al_2O_3$, $TiO_2$, $V_2O_5$, $Li_3PO_4$, $Li_xPO_yN_z$ (LiPON), $Li_xAl_yTi_zP$ (LATP), an alucone, and a titanocone.

11. The electrochemical electrode of claim 4, wherein the protection layer comprises a solid electrolyte or a material that reacts with the metal or metals of the structure to form a solid electrolyte.

12. The electrochemical electrode of claim 4, wherein the protection layer comprises at least one layer with a composition or property that varies in a thickness direction of the at least one layer.

13. The electrochemical electrode of claim 4, wherein:

the pure metal or metals of the structure includes one or more of Li and Na, and the protection layer comprises at least one of $Li_3PO_4$, $Li_xPO_yN_z$ (LiPON), and $Li_xAl_yTi_zP$ (LATP).

14. A battery comprising:

an anode formed as a foil or film and consisting essentially of a pure metal or a mixture of pure metals, the pure metal or metals being selected from the group consisting of Li, Na, and Ca;

a cathode;

an electrolyte disposed between the anode and the cathode; and a protection layer formed by atomic layer deposition on all surfaces of the anode that would otherwise be exposed to the electrolyte, wherein the protection layer allows ions of the pure metal or metals to pass therethrough while inhibiting electron passage therethrough.

\* \* \* \* \*